United States Patent [19]

Aoshima et al.

[11] Patent Number: 4,473,329

[45] Date of Patent: Sep. 25, 1984

[54] CYCLIC DRILLING MACHINE

[75] Inventors: Shozo Aoshima; Noboru Hirose; Michio Ishikawa, all of Nagoya, Japan

[73] Assignee: Brother Kogyo Kabushiki Kaisha, Nagoya, Japan

[21] Appl. No.: 314,476

[22] Filed: Oct. 23, 1981

[30] Foreign Application Priority Data

Oct. 30, 1980 [JP] Japan .............................. 55-153288

[51] Int. Cl.³ ............................................. B22B 47/34
[52] U.S. Cl. ........................................ 408/11; 408/6; 408/13; 408/16; 408/17; 250/231 SE
[58] Field of Search ......................... 408/6, 8, 9, 11, 13, 408/16, 17, 134, 187; 73/862.33, 862.34; 250/231 SE

[56] References Cited

U.S. PATENT DOCUMENTS

| | | | |
|---|---|---|---|
| 1,946,099 | 2/1934 | Norton | 73/862.33 |
| 3,283,618 | 11/1966 | Schatzman | 408/11 |
| 3,545,310 | 12/1970 | Porath et al. | 408/11 |
| 3,888,116 | 6/1975 | Spinella | 73/862.33 |
| 4,017,723 | 4/1977 | Fickes | 408/8 |
| 4,136,559 | 1/1979 | Brown | 73/862.34 |

FOREIGN PATENT DOCUMENTS 408713  8/1974  U.S.S.R. .............................. 408/13

Primary Examiner—William R. Briggs
Assistant Examiner—Daniel W. Howell
Attorney, Agent, or Firm—Browdy and Neimark

[57] ABSTRACT

A drilling machine is provided with a quill feed device for reciprocating a quill, a driving member and a driven member, disposed between a spindle rotatably supported by the quill and a driving source therefor in such a manner as to produce a relative angular displacement therebetween according to magnitude of a load applied on a tool held by the spindle, a detector generating a series of pulse signals correlated to the relative angular displacement between both members, a counter numerically counting the pulse signals generated from the detector in respect of one rotation of the spindle, a memory memorizing numerical data, corresponding to the relative angular displacement while the tool being separated from a workpiece, counted by the counter device, and a comparator for comparing the value memorized in the memory and an actual counted value in the counter. The quill is, in the event the actual counted becomes larger than the memorized value by a predetermined limit, returned backwards once before being re-advanced.

11 Claims, 28 Drawing Figures

CYCLIC DRILLING MACHINE

BACKGROUND OF THE INVENTION

This invention relates to a cyclic or step feed drilling machine in which one drilling process is carried out, instead of being performed in a single stroke, by gradually deepening a bore-depth by means of repeating reciprocative movement of a tool for a plurality of times before completing the drilling process.

More particularly it relates to a cyclic drilling machine in which magnitude of a load applied on the tool is detected so that the tool is, when the detected load grows larger to a certain value, retreated backwards once for being advanced again.

As a prior art belonging to this category, a technological idea disclosed in the Japanese patent publication TOKU-K0-No. SHO 53(1978)-40745 can be cited, in which magnitude of a load applied on the tool is detected or measured by the fluctuation or variation of load current observed in a tool driving motor, and the tool, i.e. drill in this instance, is returned backwards once in response to an indication of reaching of the load current to a predetermined value.

In this kind of device a load current of a motor at a non-load status is memorized once as a minimum value ($I_o$) in a memory circuit, and a load current of a motor corresponding to a cutting (drilling) torque within the maximum allowable limit, wherein the drill can not be broken, is set in advance on the other hand as a current set value ($\Delta I_s$). Sum of the both values ($I_s$ (= $I_o + \Delta I_s$)) is regarded as a reference value. Comparing of this reference value ($I_s$) with a load current ($I$) of a motor which is detected in the course of a cutting is executed in a comparing circuit or comparator, so that the drill in advancing movement may be instantly returned backwards as soon as the load current ($I$) reaches the reference value ($I_s$), that is when a cutting torque of the maximum allowable limit is applied on the drill. When a certain predetermined period of time has elapsed after the motor was placed under a non-load condition due to the return of the drill, the then non-load current value is memorized in the memory circuit in place of the previous minimum value as a new minimum value ($I_o$). The drill is advanced again so as to resume the cutting of a workpiece which has been halfway suspended. The then load current value ($I$) of the motor is compared in the comparator with the reference value ($I_s$). When the drill receives a cutting torque of the maximum allowable limit again it is instantly returned backwards similarly to the previous instance. This type of operation is repeated until a bore of a predetermined depth is formed in the workpiece, so that the drill may be prevented from damage or breakage.

The cutting process is however finished in general within 1-3 minutes after a workpiece is placed on the drilling machine, and the motor is stopped between the finish of cutting on one workpiece and the beginning of cutting on another workpiece. In other words, the cutting is carried out in the prior art while the motor (in this instance AC motor is used, but DC motor is also permissible) is under an unstable status, as shown in FIG. 1, wherein the winding current gradually decreases from a large initial current value to a stable current value. It means that the aforesaid minimum value ($I_o$) is set while the winding current is unstable in the course of falling as shown in FIG. 2 and the reference value ($I_s$), on which the cutting process depends, is set according to this minimum value ($I_o$). Comparison of the minimum value ($I_o$) with a current value ($I_{o1}$), which would have been attained if the minimum value had been set when the winding current reached the reference value ($I_s$), will show that the current value ($I_{o1}$) is smaller than the minimum value ($I_o$) by an amount of ($\Delta I\alpha$).

For preventing the drill from the breakage, the reference value ($I_s$) must be made, therefore, smaller by the difference ($\Delta I\alpha$) of the minimum value ($I_o$) minus the current value ($I_{o1}$), i.e., to ($I_{ss}$ (= $I_s - \Delta I\alpha$)). It signifies that for making the reference value ($I_s$) smaller by $\Delta I\alpha$, the aforementioned current set value ($\Delta I_s$) must be set smaller by that much. In practical machining lines, such as a machining factory, wherein power source is variable in voltage even when a motor itself is in a stable status, the winding current thereof varies a great detal so that mistaking of this variation for that owing to load variation will cause an error operation. External noise will also cause the error operation. Reducing of the current set value ($\Delta I_s$) is therefore envisaged with a limit. The step feed type cutting (drilling) with a thin drill which requires setting of a small current set value ($\Delta I_s$) is practically next to impossible.

Comparison of a characteristic curve $I_{p1}$ of the winding current in the initial stage of the motor driving starting from a sleeping status with those curves $I_{p2}$ and $I_{p3}$ in the initial stage of the motor driving at a repeatedly operated status will show that the time required for decreasing value is longer in the curve $I_{p1}$ than in the others $I_{p2}$, $I_{p3}$, due to variation in the motor itself such as internal resistance in the motor. And the difference ($I\alpha$) is maintained in a larger state, in other words, a status where the difference ($\Delta I\alpha$) is large is maintained for a long period of time in the drilling of the workpiece in the initial operation period. It means that the time with a large difference ($\Delta I\alpha$) continues for a comparatively longer period, particularly in a colder region for quite a long time, before the motor enters a stabilized operation wherein the machining can be stably performed. It naturally deteriorates the operational efficiency, to the great disadvantage.

In the conventional devices variation of the load current, i.e. variation of the winding current of the motor which is caused by the load variation is the detection object. It is quite difficult to get true variation of the cutting torque in this method, because the variation obtained herewith is nothing but a sum of the true variation value of the cutting torque plus a torque produced in the transmission system from the motor to the drill. And the torque produced in the transmission system is variable in itself during operation thereof. It is, therefore, problematical in this connection whether the variation of the winding current can be truly regarded as the variation of the cutting torque.

Besides, the technology disclosed in the Japanese patent publication TOKU-SO-No. SHO 54(1979)-23158 attempts to raise in put impedance by means of an emitter follower with FET (field-effect-transistor) so as to minimize leakage of electric charge which is charged in a capacitor for the purpose of preventing the timewise variation of the minimum value ($I_o$) in a memory circuit storing the minimum value ($I_o$). It is however practically very difficult to prevent the leakage in the capacitor, so exact maintenance of the minimum value ($I_o$) and subsequent setting as well as maintaining of an exact reference value (Io) is next to impossible, to the great problem.

SUMMARY OF THE INVENTION

A principal object of this invention, which was made from such a background, is therefore to provide a drilling machine capable of preventing the tool breakage to the greatest possible extent.

Another object of this invention is to provide a drilling machine containing overload detecting means which is free from an otherwise possible error operation even when the same is started after a long time suspension.

Another object of this invention is to provide a drilling machine containing overload detecting means which is free from an error operation otherwise possibly caused by voltage variation of a power supply.

Another object of this invention is to provide a drilling machine containing detecting means which is fully capable, irrespective of its simple structure, of numerically or digitally detecting a load applied on the tool thereof.

Another object of this invention is to provide a drilling machine containing overload detecting means, wherein a reference value for the overload detection is renewed at the end of every reciprocation of the quill, capable of surely detecting the overload even when the machine is still in an unstable operational status immediately after the starting thereof.

Still another object of this invention is to provide a drilling machine which is capable, when the number of reciprocation of the quill exceeds a predetermined value in the course of one drilling process, giving a warning to the machine operator under judgement of deteriorated cutting ability of the tool or else automatically stopping the operation of the machine.

A preferred embodiment of a drilling machine according to this invention comprises (a) a quill reciprocably mounted in a frame to rotatably support a spindle having a tool at one end thereof, (b) quill feed means for reciprocating the quill in forward and backward directions, (c) a driven member operatively connected with the spindle, (d) a driving member disposed on a common axis with the driven member, (e) means for transmitting rotation from the driving member to the driven member, while permitting a relative angular displacement to take place between the two members in proportion to magnitude of load applied to the driven member, (f) angular displacement detecting means for detecting the relative angular displacement between the two members to generate a series of pulse signals correlative with the relative angular displacement in number thereof, (g) means for counting the number of the pulse signals, (h) memory means for memorizing the number of the pulse signals counted by the counting means while the tool being in a position separated from a workpiece as a reference number, (i) means for comparing the actual number of the pulse signals which are counted by the counting means while the tool cutting the workpiece said reference number to generate an overload signal when a difference between the two numbers exceeds a predetermined value, and (j) control means for controlling the quill feed means to make the quill repeat a reciprocating cycle wherein the quill once returns to the separated position on the way of drilling operation in response to the overload signal and advances again for resuming the drilling operation.

In this embodiment the counted number in the counting means at an initial advancing movement of the quill is memorized in the memory means, and the memorized number is thereafter compared with the number which the counting means counts for each one rotation of the spindle in the comparing means for monitoring the load applied on the tool, so that when the counted number in the counting means exceeds the memorized number by a predetermined value the tool may be returned backwards once to a position spaced away from a workpiece.

Feeding of the tool is controlled in this way by detecting the load applied on the tool through numerical detecting of the extent of relative angular displacement between the driving member and the driven member. The cutting torque applied on the tool can be exactly detected, in this embodiment, without being affected by voltage variation of a power supply and variation of the winding current in the motor itself as was usual in the prior art. It is also possible in this embodiment to use a thin drill without fear of breaking, which enables boring with a variety of bore sizes and enhances operational efficiency to a great extent.

The drilling machine preferably further comprises position sensing means for generating a most forward position signal when the quill has been moved to a predetermined most forward position. The quill is returned in response to the most forward position signal to a predetermined most backward position by the controlling means.

The angular displacement detecting means preferably comprises a wheel disk attached to one of the driving member and the driven member, and having a plurality of signal portions formed on a circle described about the common axis, of the driving member and the driven member, signal portion detecting means for detecting the signal portions of the wheel disk to generate the pulse signals when the wheel disk is rotated, and a shutter disk attached to the other of the driving member and the driven member opposite to the wheel disk and having a shutter portion formed thereon for partially shutting the signal portions to interrupt the detecting operation of the signal portion detecting means. The shutter portion is provided with one end portion adapted to move relatively to a specific one of the signal portions according to the relative angular displacement to change the number of the signal portions which are located between the one end of shutter portion and the specific one of signal portions so as to be detected by the signal portion detecting means. The counting means counts the number of the pulse signals from the signal portion detecting means in each rotation of the wheel disk.

DETAILED DESCRIPTION OF THE PREFERRED EMBODIMENT

Figure 3:
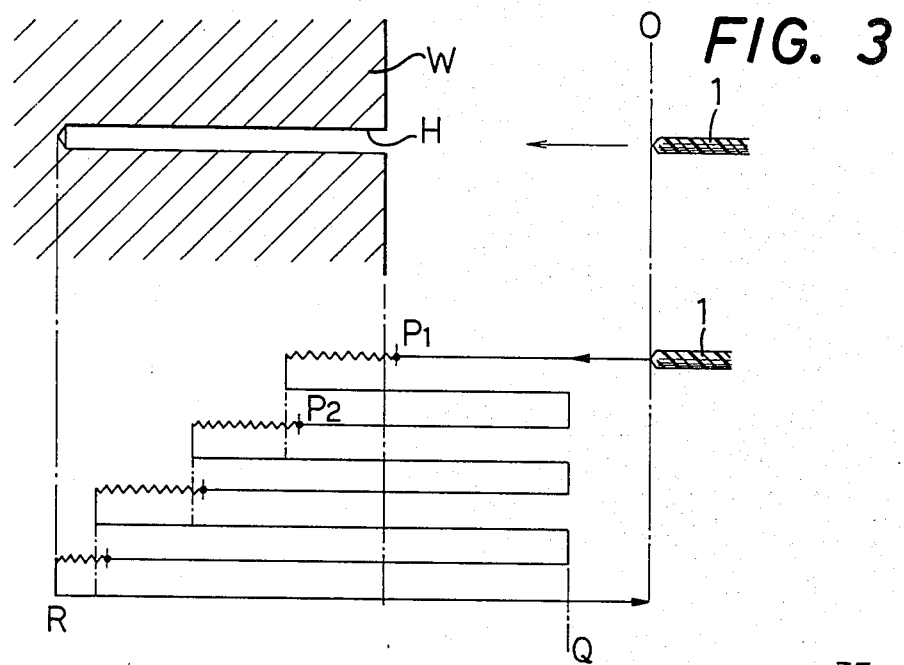
FIG. 3 is a step feed operation diagram in a drilling machine according to the invention.

An embodiment of this invention applied to a drilling machine will be described hereinunder with reference to the accompanying drawings. In this embodiment, the drilling operation by the drilling machine is performed in the following manner. As shown in FIG. 3, a drill 1 positioned in an origin or the most backward position O advances toward a workpiece W at a rapid speed while it rotates, and at a first switching point $P_1$ just before reaching the workpiece W (approximately 2 mm before the workpiece in this embodiment) the above advancing speed is switched down to an optimum drilling speed and at this speed the drilling is started. In the course of this drilling operation, if a load, i.e., a cutting torque above a certain level in a direction opposite to the rotational direction is applied to the spindle having the drill 1, the drill 1 returns at a rapid speed to a predetermined turning point Q positioned between the origin O and the first switching point $P_1$, then from the turning point Q the drill 1 advances at a rapid speed to a second switching point $P_2$ just before reaching the bottom of the first drilled bore (approximately 2 mm before the bottom like the previous case). Thereafter, the advancing speed is switched down to an optimum drilling speed as in the previous case and at this speed the drilling operation is performed, and when the load above a certain level is applied again to the drill 1, the drill 1 returns to the turning point Q at a rapid speed. In this way, such an operation is repeated until a predetermined depth (the most forward position) R is reached, and upon completion of drilling up to the depth R the drill 1 returns to the origin O at a rapid speed.

Figure 2:
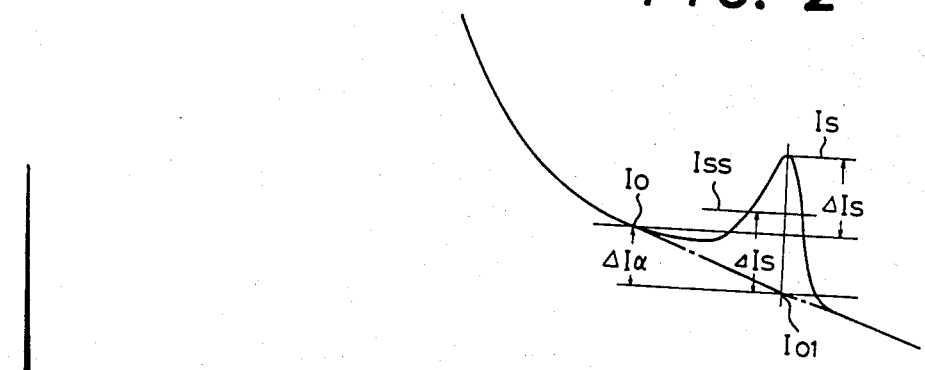
FIG. 2 is a curvilinear view showing timewise changes in the load current value of the motor during a cutting operation.

The construction of the drilling machine in this embodiment will be described hereinunder with reference to FIGS. 4 et seq. A quill 3 is supported by a frame 2 of the drilling machine so as to be slidable in the axial direction, and in the position of axis within the quill 3 there is inserted a spindle 4 which is rotatably carried by bearings 5. The drill 1 is held by a chuck 6 which is affixed to the front end of the spindle 4. In this specification, the left side of FIG. 2 is assumed to be forward.

The front end portion of the quill 3 is being inserted into an air cylinder chamber 7 formed within the frame 2, and a piston head member 8 is fixed to the outer periphery of the quill 3 within the cylinder chamber 7. Air is supplied from a first passage 9 to the rear side of the piston head member 8 whereby the quill 3 moves forward at a rapid speed together with the spindle 4, while air is supplied from a second passage 10 to the front side of the piston head member 8 whereby the quill 3 is moved backward at a rapid speed together with the spindle 4. That is to say, air drive means for moving the quill 3 forward and backward in its axial direction is constituted of the air cylinder chamber 7, the piston head member 8 and an air source. To the rear end of the quill 3 there is fixed an abutment 11.

At the rear portion of the frame 2 and on the same axis as the spindle 4 there is rotatably mounted a rotary sleeve 13 via a pair of ball bearings 12. Within the rotary sleeve 13 there is disposed a connecting sleeve 15, which extends along the same axis as the rotary sleeve 13, and its rear end is rotatably supported by the rotary sleeve 13, while the front end of the connecting sleeve 15 is supported by the frame 2 via a ball bearing 16. Furthermore, the rear end portion of the spindle 4 is inserted in the connecting sleeve 15. The spindle 4 and the connecting sleeve 15 are coupled by a spline 14a and a spline key 14b for integral rotation and relative movement in the axial direction. Around the connecting sleeve 15 there is wound a coiled transmission spring 17 concentrically with a slight clearance therebetween, and one end of the spring 17 is retained in a retaining hole 18 of an inward flange formed on the internal surface of the rotary sleeve 13, while the other end thereof is retained in a retaining hole 20 of an outward flange 19 formed on the outer periphery of the connecting sleeve 15, and the rotation of the rotary sleeve 13 is transmitted by way of the transmission spring 17 to the connecting sleeve 15 and to the spindle 4. Consequently, in case a load is applied to the spindle 4 in its rotational direction, a relative rotational or angular displacement proportional to the load is made between the rotary sleeve 13 and the connecting sleeve 15 against the spring force in the torsional direction of the transmission spring 17. If a load exceeding a certain level is applied in the wind-up direction of the transmission spring 17, the spring 17 will wind closely about the outer periphery of the connecting sleeve 15 to prevent its further torsion, that is, the spring 17 is prevented from being twisted beyond its torsional limit whereby the damage and breakage of the spring 17 can be prevented.

At the flange 19 of the connecting sleeve 15 and at the front end portion of the rotary sleeve 13 there are mounted on a wheel disk 21 and a shutter disk 22 respectively in opposed relation to each other. With both disks 21 and 22 interposed, there are disposed an angular displacement detecting photocoupler 23 and a resetting photocoupler 24. The angular displacement detecting photocoupler 23 is adapted to detect a relative angular displacement above a predetermined amount between both disks 21 and 22 due to a relative rotational displacement between the rotary sleeve 13 and the connecting sleeve 15, whereupon the cutting torque of the drill 1 is measured in a manner as will be described later, and when the cutting torque has exceeded a certain level, the supply of air is switched from the first passage 9 to the second passage 10 so that the quill 3 may return rapidly. The construction of the wheel disk 21 and that of the shutter disk 22 will be described in detail later.

At the rear end of the rotary sleeve 13 there is mounted a pulley 25, while at the rear end of the frame 2 there is disposed a three-phase induction spindle motor 26, with a pulley 27 being mounted on the motor shaft, and a toothed belt 28 is stretched between the pulleys 25 and 27 for transmitting the rotation of the spindle motor 26 to the rotary sleeve 13.

In the front portion of the frame 2 there is disposed a hydraulic cylinder housing 31 having a chamber 31a adjacent to the air cylinder chamber 7 so as to have an axis parallel to that of the air cylinder chamber 7, and a hollow ram 32 rearwardly extends from the cylinder chamber 31a. A plug 33 is fitted into an opening portion formed in the front end of the hollow ram 32.

Figure 10:
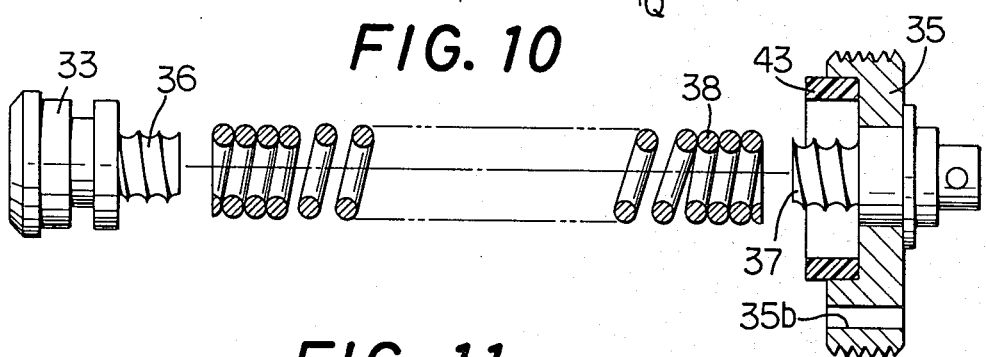
FIG. 10 is an exploded sectional view on a larger scale showing the relationship of a plug and a movable member to a coiled spring.
Figure 11:
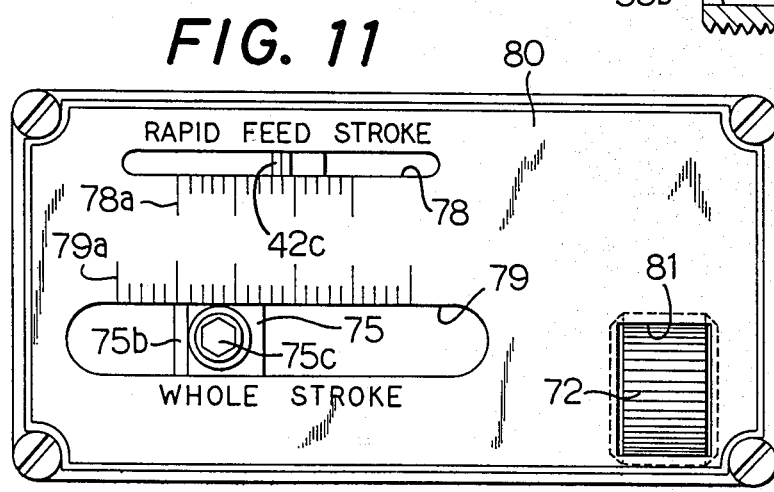
FIG. 11 is an enlarged elevational view of a display panel.

In the rear portion of the frame 2 there is disposed a cylindrical adjusting member 34 for rotational operation, the adjusting member 34 having an operating portion 34a on the outer periphery thereof and also having internal threads 34b on the internal surface thereof. The rear end portion of the hollow ram 32 is loosely fitted into the adjusting member 34. Within the adjusting member 34 there is disposed a movable member 35 which has external threads 35a formed on its outer periphery, the external threads 35a being in engagement with the internal threads 34b. As shown in FIG. 10, protrusions 36 and 37 are formed on the opposed surfaces of the cap 33 and the movable member 35, respectively, and a coiled spring 38 is anchored between the protrusions 36 and 37 whereby the hollow ram 32 is normally urged rearwards via the cap 33.

To the movable member 35 there is affixed a cushioning member 43 for receiving the rear end surface of the hollow ram 32. The protrusion 37 of the movable member 35 shown in FIG. 10 is disposed in an eccentric position with respect to the center of the movable member 35, and a restriction rod 39 is supported by the frame 2, the restriction rod 39 extending forward through a restriction hole 35b formed in the movable member 35, whereby the rotation of the movable member 35 is prevented. Consequently, by rotating the adjusting member 34 the movable member 35 is moved forward or backward whereby the return position of the rear end of the hollow ram 32 shown in FIG. 4 is adjusted in the longitudinal direction. After this adjustment the adjusting member 34 is fixed to the frame 2 by a suitable fixing member. On both front and rear sides of the adjusting member 34 there are respectively mounted rings 40 and 41 having a small friction coefficient to prevent the adjusting member 34 from moving in axial direction.

Figure 9:
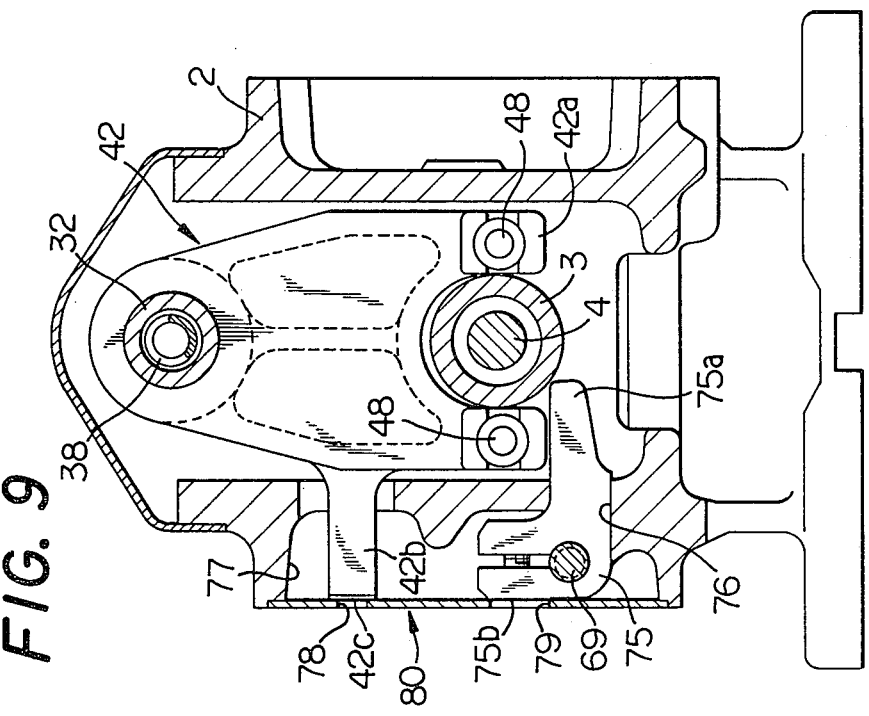
FIG. 9 is an enlarged sectional view taken on line 9—9 of FIG. 5.
Figure 8:
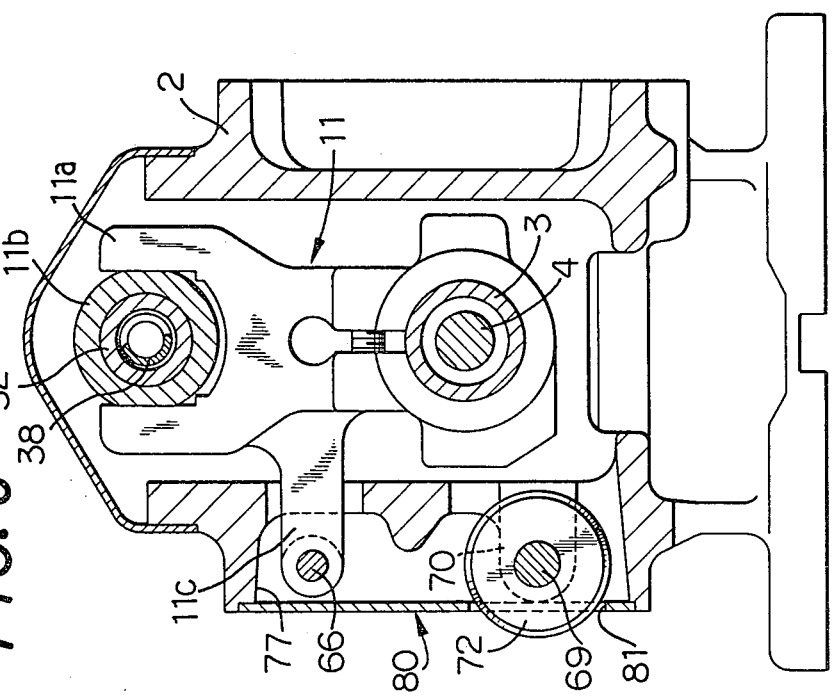
FIG. 8 is an enlarged sectional view taken on line 8—8 of FIG. 5.

Onto the outer periphery of an approximately intermediate portion of the hollow ram 32 there is fixed an engaging piece 42, which is provided with, as shown in FIG. 9, a bifurcated portion 42a extending so as to be positioned with slight gaps on both sides of the quill 3. As shown in FIG. 8, moreover, a bifurcated portion 11a is formed at the upper end portion of the abutment 11, and to the bifurcated portion 11a there is fixed a sleeve 11b through which is slidably inserted the hollow ram 32. As the quill 3 moves forward, the lower end portion of the abutment 11 comes into engagement with the bifurcated portion 42a of the engaging piece 42 whereby the hollow ram 32 is moved forward integrally with the quill 3. A pair of cushioning members 48 are affixed to the rear sides of the bifurcated portion 42a of the engaging piece 42, and the abutment 11 is brought into engagement with the cushioning members 48.

On the front side of the hydraulic cylinder housing 31 there is disposed a flow control valve 44. As the hollow ram 32 is moved forward, the pressure oil within the hydraulic cylinder chamber 31a is discharged through the flow control valve 44 while its flow rate is controlled, and the discharged pressure oil is supplied and stored into an oil sump 45 which is disposed on the opposite side to the hydraulic cylinder chamber 31a with the air cylinder chamber 7 interposed therebetween. According to the flow-adjusting throttle action of the flow control valve 44 the advancing speed of the hollow ram 32 is restricted; that is, after engagement of the abutment 11 with the engaging piece 42 in the course of the forward movement of the quill 3 together with the spindle 4 which carries the drill 1, the advancing speed of the quill 3 is switched down and its speed is set to an optimum drilling speed. Consequently, the position of the drill 1 at the time of engagement of the abutment 11 with the engaging piece 42 induced by the forward movement of the quill 3 is the first switching point $P_1$ shown in FIG. 3. On the inflow side of the flow control valve 44 there is mounted a filter 46.

On the front side of the hydraulic cylinder housing 31 there is disposed a check valve 47 which allows the flow of pressure oil only in the direction from the oil sump 45 to the hydraulic cylinder chamber 31a thereby permitting the backward movement of the hollow ram 32.

Figures 6, 7:
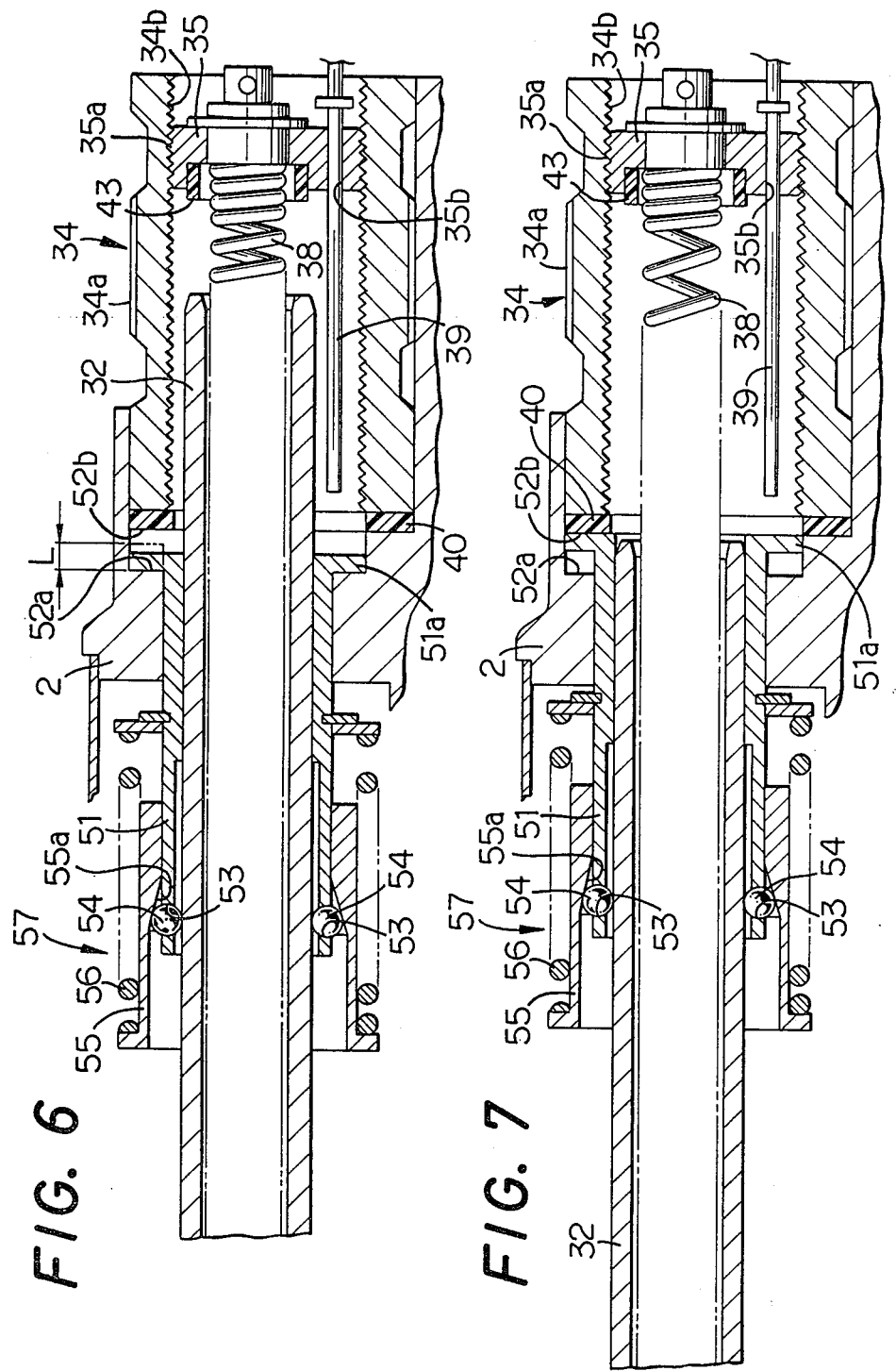
FIGS. 6 and 7 are respectively a partially enlarged sectional view showing an operation mode of a one-way clutch in the drilling machine.

At a portion intermediate between the movable member 35 and the engaging piece 42 a sleeve 51 is fitted over the hollow ram 32 so that the hollow ram 32 may be axially slidable, and it is axially slidably supported by the frame 2. At the rear end of the sleeve 51 there is formed a flange portion 51a. As shown in FIGS. 6 and 7, the frame 2 and the ring 40 are provided with restriction surfaces 52a and 52b respectively in opposed manner to the front and rear surfaces of the flange portion 51a. The spacing between the restriction surfaces 52a and 52b determines a movable distance L of the flange portion 51a. In the peripheral wall of the front end portion of the sleeve 51 there are formed a plurality of retaining through holes 53 at equal intervals in the circumferential direction, and in each of those holes there is retained a steel ball 54 rotatably.

A cylindrical slide, a ball pressing member, 55 is carried on the outer periphery of the sleeve 51 so as to be slidable in the axial direction and on its inner surface there is formed a tapered or conical internal surface 55a which is gradually divergent toward the advancing direction of the quill 3 and which is engageable with the balls 54. The slide 55 is forwardly biased by a coiled spring 56, and when the quill 3 is disposed in the origin position O and the abutment 11 is in its most backward position, the slide 55 is moved backward by the abutment 11 against the biasing force of the coiled spring 56. The balls 54, the slide 55 and the coiled spring 56 constitute a one-way clutch 57 which allows a relative movement of the hollow ram 32 to the sleeve 51 when the hollow ram 32 moves forward and which, when the hollow ram 32 moves backward, allows an integral movement of the sleeve 51 and the hollow ram 32 by the allowed moving distance L of the sleeve 51 and thereafter prevents a further movement. More detailed function of the one-way clutch 57 which functions as the coupling means will be described later.

Figure 5:
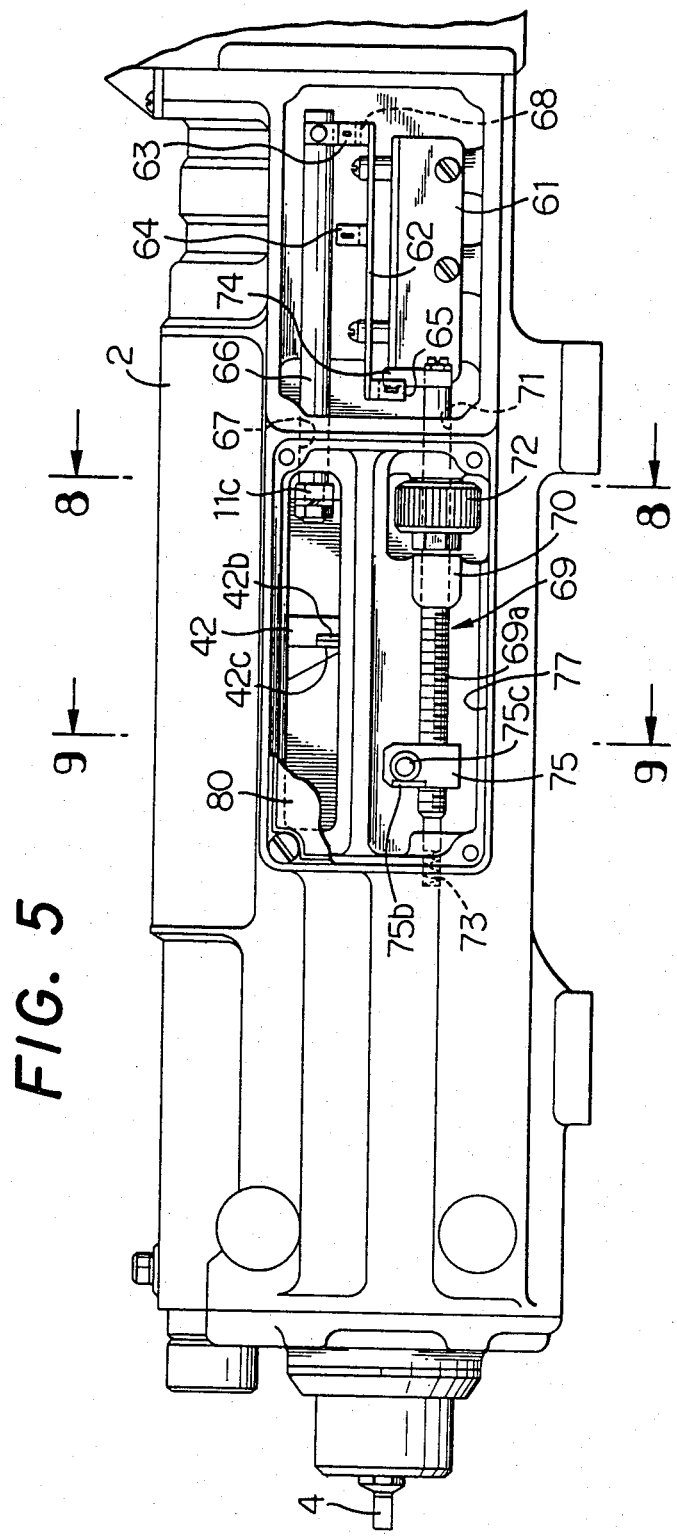
FIG. 5 is a partially cutaway elevational view of the drilling machine.

As shown in FIG. 5, to the rear part of the frame 2 there is fixed a mounting plate 62, which is a printed board, through a bracket 61. On a rear end portion of the upper surface of the mounting plate 62 there is disposed an origin or most backward position detecting photocoupler 63, and on an intermediate portion of the same upper surface there is disposed a turning point position detecting photocoupler 64, and on the front end portion of the lower surface thereof there is disposed a most forward position detecting photocoupler 65.

As shown in FIGS. 5 and 8, an arm portion 11c is formed projectionally from one side edge of the abutment 11, and to the free end of the arm portion 11c there is fixed a mounting rod 66 which extends to the rear through a guide hole 67 formed in the frame 2. To the rear end of the mounting rod 66 there is fixed a rear shutter piece 68 which, as a result of forward and backward movement of the mounting rod 66, is capable of getting in between a light emitting diode and a phototransistor of the most backward position detecting photocoupler 63 and of the turning point position detecting photocoupler 64, and shutting light emitted from the light emitting diode.

Below the front portion of the mounting rod 66 there is disposed an adjusting rod 69 which extends parallelly to the quill 3. The adjusting rod 69 is carried at an approximately intermediate portion thereof by a bearing 70 which is integral with the frame 2, and a portion thereof near its rear end is carried in a guide hole 71 formed in the frame 2, whereby the adjusting rod 69 is made rotatable and slightly movable back and forth. Between the bearing 70 and the guide hole 71 there is mounted an operating knob 72 on the adjusting rod 69 for turning the latter. On the outer periphery of the adjusting rod 69 ahead of the bearing 70 there is formed a threaded portion 69a, and the spring force of a coiled spring 73 acts on the front end of the adjusting rod 69 to urge the latter toward the rear. Furthermore, to the rear end of the adjusting rod 69 there is fixed a front shutter piece 74 which is normally positioned slightly out of the gap between a light emitting diode and a phototransistor of the most forward detecting photocoupler 65 and which, upon a slight forward movement of the adjusting rod 69, shuts light emitted from the light emitting diode to the phototransistor.

As shown in FIGS. 5 and 9, a stroke dog 75 is mounted on the threaded portion 69a of the adjusting rod 69, and an arm portion 75a formed integrally with the lower portion thereof extends as far as near the quill 3 through a slit 76 formed in the frame 2. Consequently, by turning the adjusting rod 69 with the operating knob 72 the position of the stroke dog 75 can be adjusted in the longitudinal direction of the adjusting rod 69, and after this adjustment the stroke dog 75 is clamped with a clamp screw 75c to prevent its movement. The abutment 11 as it advances together with the quill 3 comes into engagement with the arm portion 75a of the stroke dog 75 whereby the adjusting rod 69 is moved forward.

The wheel disk 21, the shutter disk 22, the angular displacement detecting photocoupler 23, the turning point position detecting photocoupler 64, the rear shutter piece 68, etc. constitute step feed control means for reciprocating the quill 3 without returning it to the most backward position. On the other hand, the stroke dog 75, the most forward position detecting photocoupler 65, the front shutter piece 74, etc. constitute means for nullifying the aforesaid step feed control means on the basis of a detected signal of the most forward drilling position of the quill 3. Detailed function of these means will be described later together with that of the one-way clutch 57.

As shown in FIG. 5, an opening 77 is formed in the frame 2 in corresponding relation to the moving range of the engaging piece 42 and to the adjusting rod 69, and the opening 77 is covered by a display panel 80 shown in FIG. 9. In the display panel 80 there are formed two long apertures 78 and 79 with graduations 78a and 79a printed respectively along one side edges thereof, and there is also formed a rectangular aperture for allowing a part of the operating knob 72 to project to the exterior. Through the upper long aperture 78 an indication line 42c formed on the arm portion 42b of the engaging piece 42 can be seen, while through the lower long aperture 79 an indication line 75b formed on the stroke dog 75 can be seen, whereby the first rapid feed stroke and total movement stroke of the drill 1 can be perceived respectively.

Figure 12:
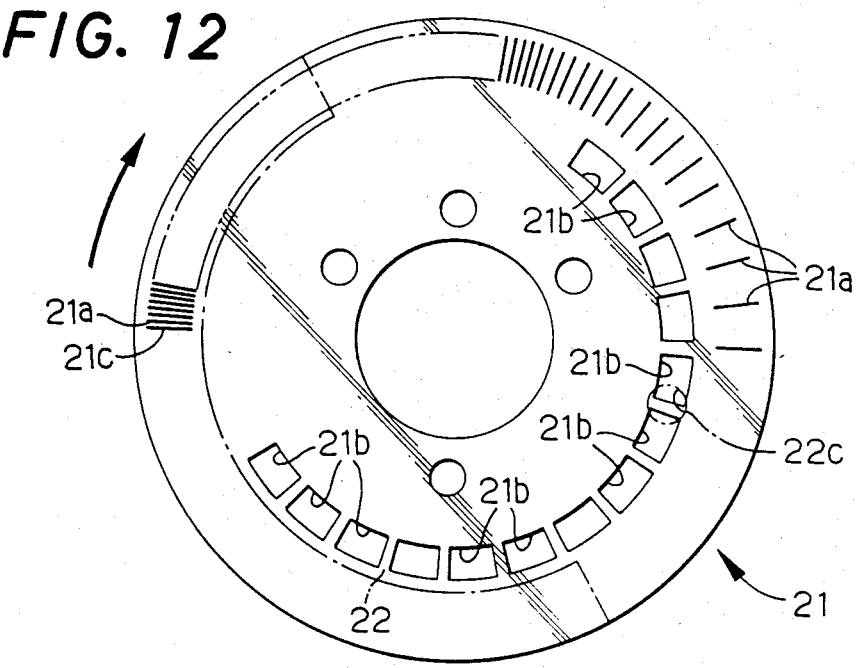
FIG. 12 is an enlarged elevational view of a wheel disk.
Figure 13:
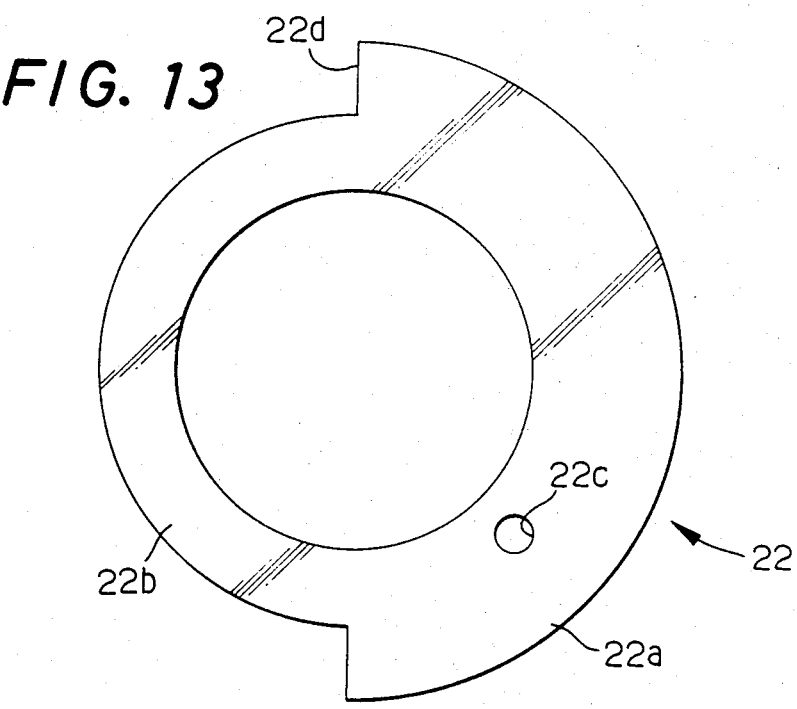
FIG. 13 is an enlarged elevational view of a shutter disk.
Figure 14:
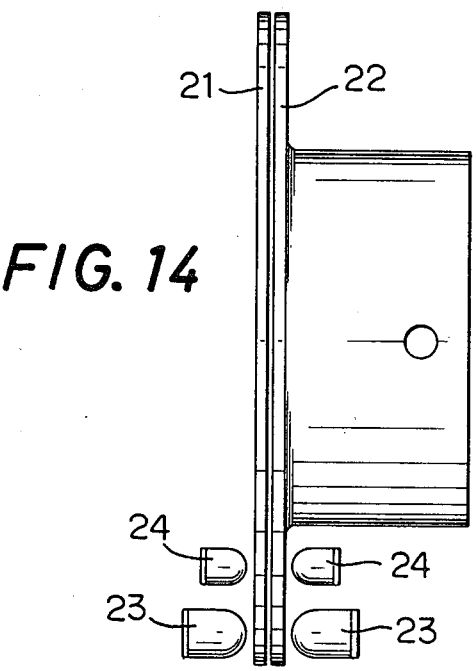
FIG. 14 is a side view showing the arrangement of the wheel disk relative to the shutter disk.

The construction of the wheel disk 21 and the shutter disk 22 for measuring the aforesaid cutting torque will be described in detail hereinunder with reference to FIGS. 12 through 14.

On the wheel disk 21 there are arranged a total of eighty-nine slits 21a in the rotational direction of the wheel disk 21, starting from a slit designated by 21c. The slits 21a are formed on a circle about the axis of the wheel disk 21. The initial seventy-one of the slits 21a are arranged at equiangular intervals of 1.5 degrees and the remaining slits are arranged at exponentially increasing intervals. A total of fourteen square through holes 21b are also formed in the wheel disk 21 continuously from a position displaced by an angle of about 131 degrees in the rotational direction thereof with respect to the slits 21a. On the other hand, the shutter disk 22 includes a slit shutting portion 22a for shutting the slits 21a when opposed to the wheel disk 21, a through hole shutting portion 22b for shutting the through holes 21b, and a reference hole 22c opposed to the through holes 21b. The slit shutting portion 22a has an edge portion 22d. The shutter disk 22 is disposed so as to assume such a relative position as indicated with one-dot chain line in FIG. 12 with respect to the wheel disk 21 (the position wherein the thirty-third and subsequent slits 21a are shut by the slit shutting portion 22a in the present embodiment) in a stopped state of the drill 1.

With the above arrangement, the angular displacement detecting photocoupler 23 and the resetting photocoupler 24 detect the passing of the slits 21a and that of the reference hole 22c, respectively. In this case, even if the reference hole 22c passes the photocoupler 24 in such a state as indicated with one-dot-chain line in FIG. 12 with respect to the through holes 21b, the photodiode can fully detect light emitted from the light emitting diode of the photocoupler 24.

When the spindle motor 26 is driven to rotate the drill 1 in an unloaded state, the shutter disk 22 is placed under a slight relative angular displacement in the rotational direction with respect to the wheel disk 21 by virtue of the torsion of the transmission spring 17. The edge portion 22d of the slit shutting portion 22a, therefore, goes away from the slit 21c of the wheel disk 21 by an amount corresponding to eight slits in the present embodiment and thereafter it rotates at the same rotational speed as the slit 21c without further relative angular displacement. In this state the photocoupler 23 detects 40 (=32+8) slits 21a for every one rotation of the wheel disk 21.

Next, when a cutting torque is applied to the drill 1, the shutter disk 22 undergoes an angular displacement in the rotational direction in proportion to the magnitude of the cutting torque with respect to the wheel disk 21, thus causing the slits 21a to additionally come out of the shutting portion 22a of the shutter disk 22 by a number corresponding to that angular displacement so that the photocoupler 23 detects the passing of the slits 21a by the foregoing number plus the additional number just mentioned for every one rotation of the wheel disk 21.

In this way the number of passing of the slits 21a is detected by the photocoupler 23 at every rotation of the wheel disk 21, and on the basis of this detection there is determined a variation in the cutting torque of the drill 1 by a drive control unit as will be described later. When the cutting torque thus detected has reached a certain value, the drill 1 is moved backward. On the other hand, the resetting photocoupler 24 detects the passing of the reference hole 22c after the angular displacement detecting photocoupler 23 has detected the passing of all the slits 21a for every rotation of the wheel disk 21, and a detection signal from the photocoupler 24 is output to the drive control unit.

Figure 1:
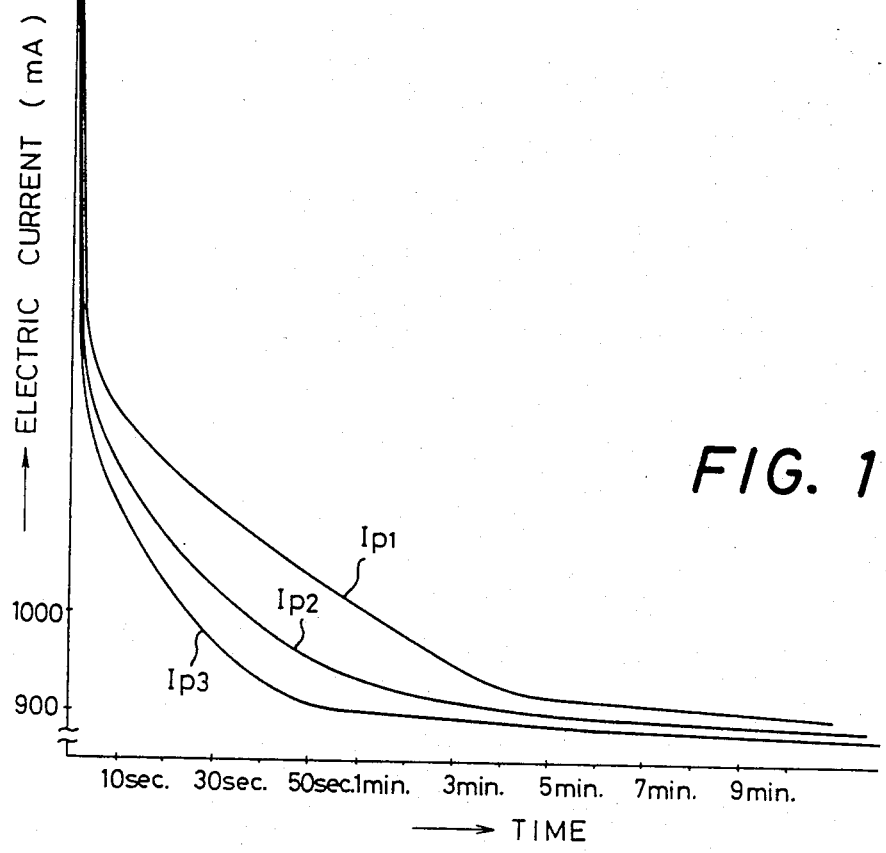
FIG. 1 is a curvilinear view showing timewise changes in the load current value of a motor.

The following description is now provided to explain the operation of the drilling machine having the above construction. For drilling a desired depth of a bore H shown in FIG. 1, first in conformity with the desired depth of the bore H the adjusting rod 69 is rotated with the operating knob 72 shown in FIG. 5 to adjust the position of the stroke dog 75; that is, this adjustment is made so that when the quill 3 has advanced and the drill 1 reached the desired depth of the bore H formed, the abutment 11 on the quill 3 comes into engagement with the arm portion 75a of the stroke dog 75. After this adjustment, the clamp screw 75c is tightened.

Figure 4A:
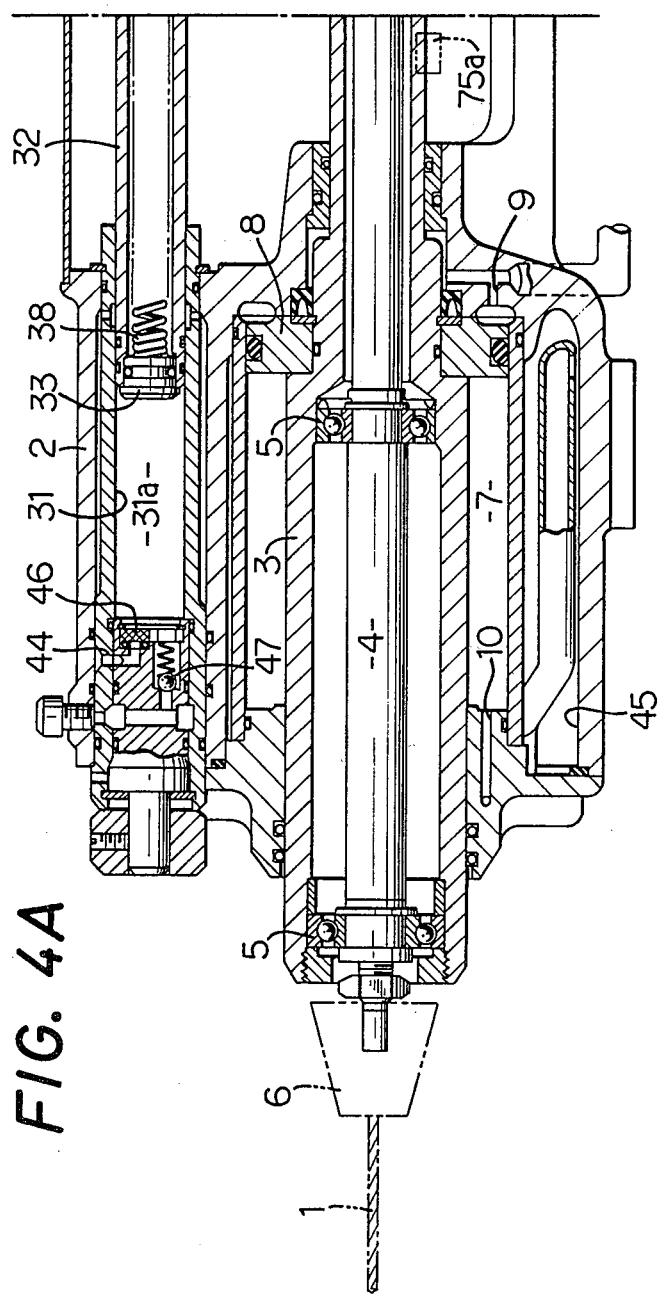
FIGS. 4a and 4b are axial sectional views of the whole of a drilling machine to which the invention was applied.
Figure 4B:
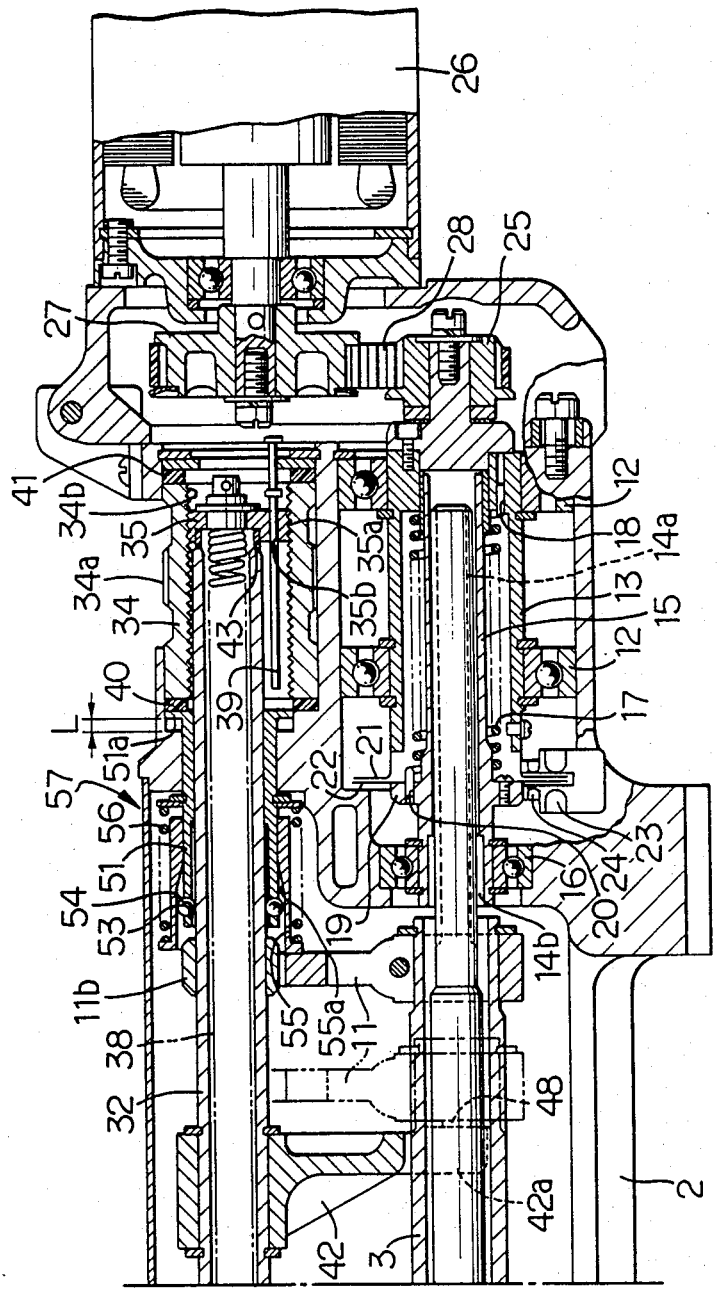

Following the adjustment of the stroke dog 75, the adjusting member 34 shown in FIG. 4 is rotated thereby allowing the hollow ram 32, while being abutted on the movable member 35 by the biasing force of the coiled spring 38, to move back and forth to adjust the longitudinal position of the engaging piece 42 on the hollow ram 32; that is, this adjustment is made so that when the drill 1 has advanced for performing the first drilling operation and its tip end reached a position a little (about 2 mm) short of the face of the workpiece W, the abutment 11 comes into engagement with the engaging piece 42. This is the way of setting the first switching point $P_1$.

In this state, the slide 55 of the one-way clutch 57, due to its engagement with the abutment 11, is moved backward against the biasing force of the coiled spring 56 and its conical internal surface 55a is away from the balls 54.

If the spindle motor 26 is started in this state, the rotary sleeve 13 is rotated, so the connecting sleeve 15 and the spindle 4 are rotated through the transmission spring 17 and hence the drill 1 is rotated. A little later, the supply of air is switched from the second passage 10 to the first passage 9 whereby the quill 3 is moved forward at a rapid speed and the drill 1 is advanced at a rapid feed.

As the abutment 11 is separated from the slide 55 along with the forward movement of the quill 3, the slide 55 is moved forward by virtue of the biasing force of the coiled spring 56 and the conical internal surface 55a comes into engagement with the balls 54, so the balls 54 are held between the conical internal surface 55a and the outer peripheral surface of the hollow ram 32.

In other words, the slide 55 and the sleeve 51 are coupled with the hollow ram 32 through the balls 54 of the one-way clutch 57 so that, as shown in FIG. 6, the slide 55 and the sleeve 51 are moved forward by the distance L (about 2 mm) until the flange portion 51a of the sleeve 51 engages the front restriction surface 52a. The subsequent advancing force of the hollow ram 32 acts on the balls as a turning force in the direction of arrow in the same figure, and therefore this turning force acts on the slide 55 as a force in the opposite direction to the coupling direction, thus permitting the subsequent forward movement of only the hollow ram 32.

On the other hand, along with the forward movement of the abutment 11, the mounting rod 66 shown in FIG. 5 also moves forward, so that the rear shutter piece 68 moves forward from the position of the most backward position detecting photocoupler 63, past the turning point position detecting photocoupler 64.

In this way, when the drill 1 reaches the first switching point $P_1$, the abutment 11 engages the engaging piece 42 and an advancing force is imparted to the hollow ram 32. In this case, the hollow ram 32 undergoes a throttle action of the flow control valve 44 and therefore it can move only at a slower cutting feed speed than the advancing speed of the quill 3 due to the action of air, so that the advancing speed of the quill 3 may be also switched down to the cutting feed speed. Thus, the advancing speed of the drill 1 is switched to the cutting feed speed at the switching point $P_1$ just before it reaches the workpiece W, and at that speed the drill 1 starts drilling.

As the first drilling proceeds in this way, the load in the opposite direction to the rotational direction applied to the drill 1 increases gradually and rotational displacements are produced little by little between the connecting sleeve 15 and the rotary sleeve 13, thus causing changes in the relative angular displacement between the wheel disk 21 and the shutter disk 22. When the load applied to the drill 1 has reached a predetermined value, air is supplied to the front side of the piston head member 8 through the second passage 10 on the basis of a detection signal provided from the angular displacement detecting photocupler 23, whereby the quill 3 is moved backward at a rapid speed and the drill 1 returns quickly. Due to backward movement of the abutment 11 along with returning of the quill 3, the mounting rod 66 having the rear shutter piece 68 shown in FIG. 5 is also moved backward.

As the quill 3 is returned and the abutment 11 is separated from the engaging piece 42, the hollow ram 32 tends to move backward by virtue of the biasing force of the coiled spring 38, and consequently the hollow ram 32 is moved backward together with the sleeve 51 and the slide 55 as is shown in FIG. 7, but when the backward movement of the sleeve 51 is restricted upon its engagement with the rear restriction surface 52b after its backward movement by the distance L (about 2 mm), the balls 54 undergo a rotational force in the direction of arrow in the same figure. This rotational force acts on the slide 55 as a force for moving the slide 55 forward and eventually acts as a force for urging the balls 54 to the outer peripheral surface of the hollow ram 32, so that the hollow ram 32 is prevented from further returning and it is stopped in the position returned by the distance L. That is, the engaging piece 42 is also stopped in the position retreated by the distance L from the position wherein the drilling operation has been suspended.

When the mounting rod 66 has returned and the rear shutter piece 68 reached the position of the turning point position detecting photocoupler 64, a detection signal is output from the photocoupler 64 and due to this output signal the supply of air is switched from the second passage 10 to the first passage 9, causing thus the operation to be switched into a quick forward feed of the drill 1.

This forward movement of the drill 1 causes the abutment 11 to be engaged again with the engaging piece 42, but since the position of the engaging piece 42 is on this side of the previous drilling end position by the distance L, the transfer to the cutting feed speed upon engagement of the abutment 11 with the engaging piece 42 is performed this side of the bottom of the previously formed bore by the distance L (second switching point $P_2$). Therefore, the drill 1 will never strike against the workpiece W at a rapid speed.

In this way, the drill 1 is switched to a cutting feed and the drilling operation is performed, and when the load applied to the drill 1 has reached a predetermined value, the drill 1 is returned quickly on the basis of a detection signal transmitted from the angular displacement detecting photocoupler 23 in the same manner as above, and when the rear shutter piece 68 of the mounting rod 66 has reached the position of the turning point position detecting photocoupler 64, the drill 1 is switched to a rapid forward feed.

When the drill 1 has reached the desired depth R after such plural times of step feed drilling, the abutment 11 abuts the arm portion 75a of the stroke dog 75 which has been positioned in advance, whereby the adjusting rod 69 is moved slightly forward through the stroke dog 75 against the biasing force of the coiled spring 73, and the front shutter piece 74 shuts light emitted from the light emitting diode of the most forward position detecting photocoupler 65 and a detection signal is output. Due to this output signal, the operation of the turning point position detecting photocoupler 64 is nullified and air is supplied to the front side of the piston head member 8 through the second passage 10, so the drill 1 returns quickly and the rear shutter piece 68 passes the turning point position detecting photocoupler 64. Consequently, the drill 1 further returns beyond the turning point Q, and when the rear shutter piece 68 has reached the position of the most backward position detecting photocoupler 63, a detection signal is output and the rotation of the spindle motor 26 is stopped, so that the drill 1 returns to the origin (the most backward position) O and is stopped. The rotation thereof is discontinued at the origin O.

Due to return of the abutment 11 along with return of the quill 3 to the most backward position O, as previously stated, the hollow ram 32 and the sleeve 51 are moved backward by the distance L and thereafter the abutment 11 engages the slide 55, thus moving the latter backward against the biasing force of the coiled spring 56, and the conical internal surface 55a is separated from the balls 54, so that the one-way clutch 57 and the hollow ram 32 are disconnected from each other and the hollow ram 32 returns to its rear end position shown in FIG. 4 by virtue of the biasing force of the coiled spring 38. Thus, one drilling process is completed.

In this drilling machine, as set forth hereinbefore, when the cutting resistance exceeds a predetermined value, a further drilling operation is interrupted, and the switching from rapid feed to slow cutting feed is performed a little before the drill 1 contacts the face of the workpiece W or the bottom of a previously drilled bore, so the drill 1 will never strike at a rapid speed against the face of the workpiece W or the bottom of the bore. Consequently, the breakage of the drill 1 can surely be prevented and a safe operation is thereby assured.

The following is an explanation about a drive control unit in the drilling machine of the above construction with reference to FIGS. 15 through 21.

Figure 15A:
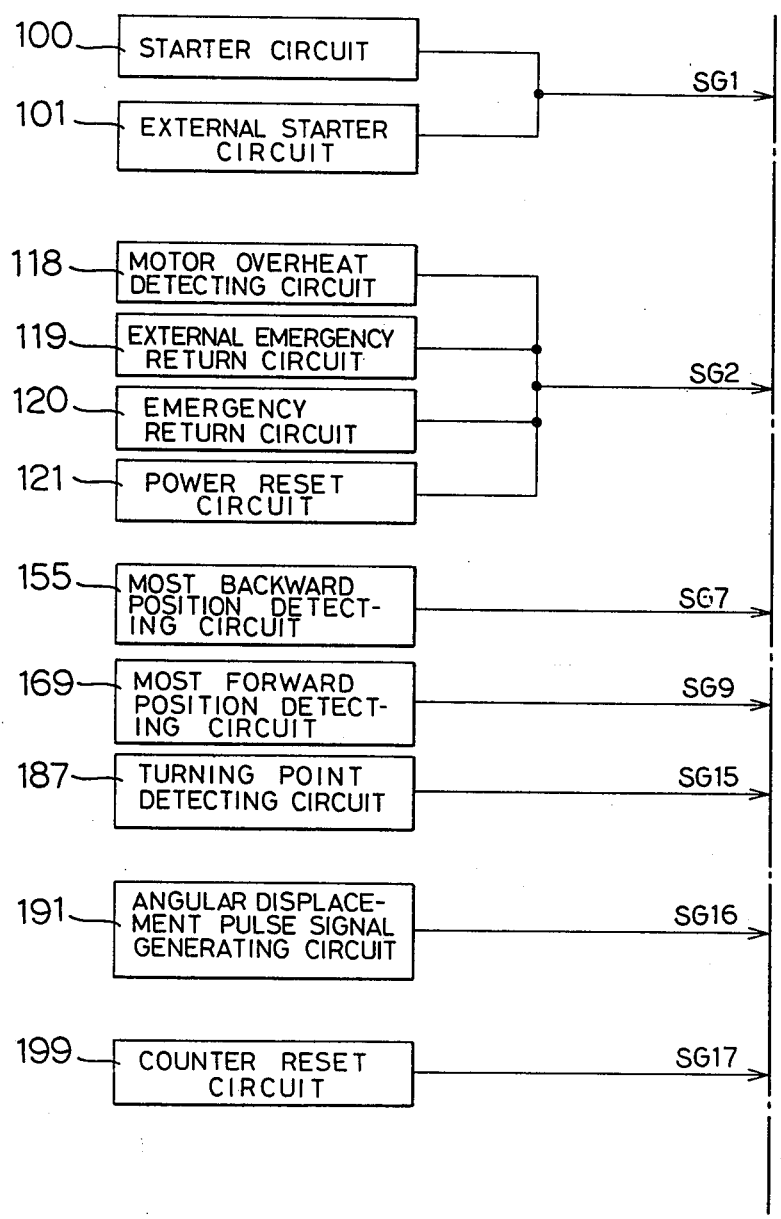
FIGS. 15a, 15b, and 15c are electrical block circuit diagrams of a drive control unit.
Figure 15B:
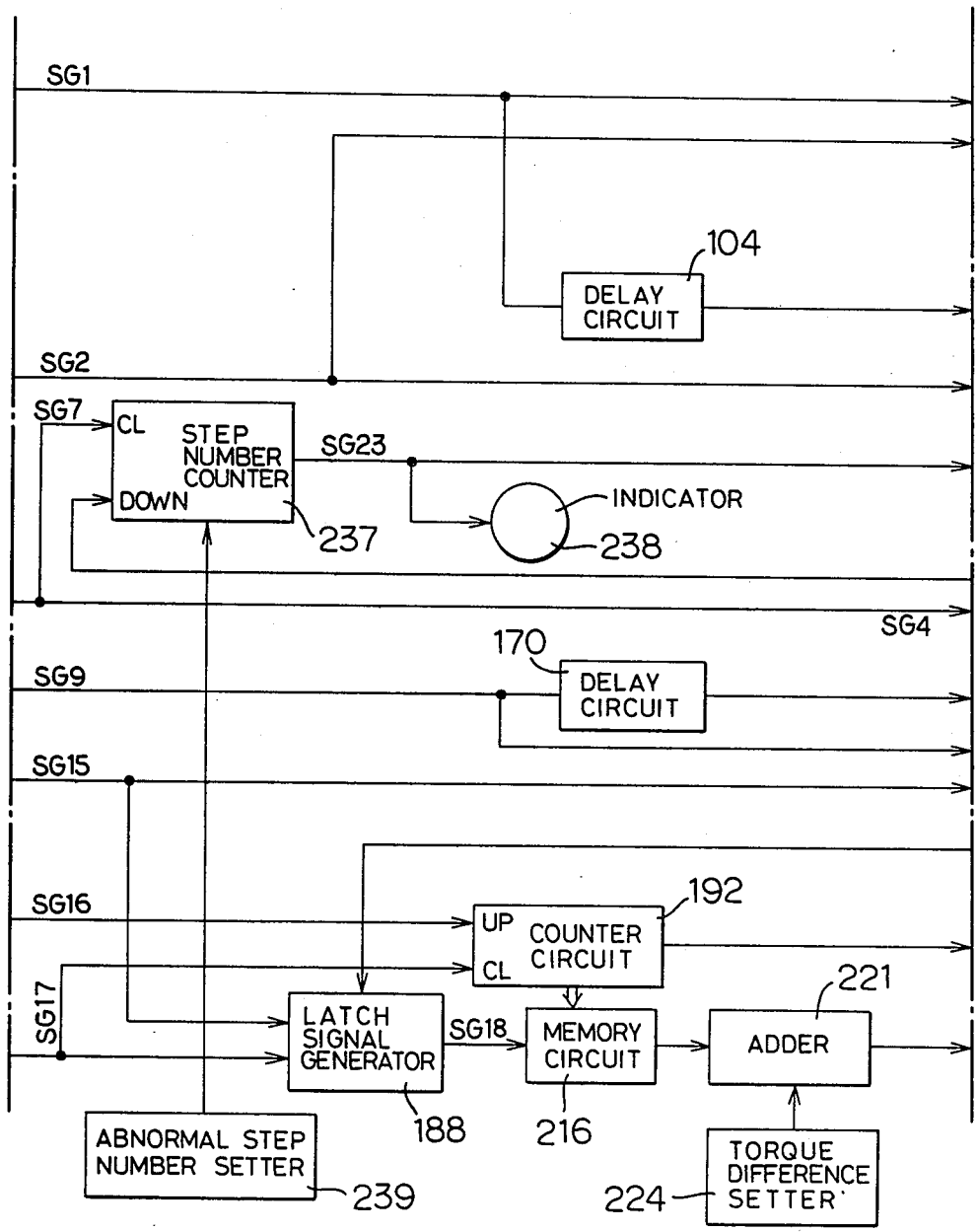
Figure 15C:
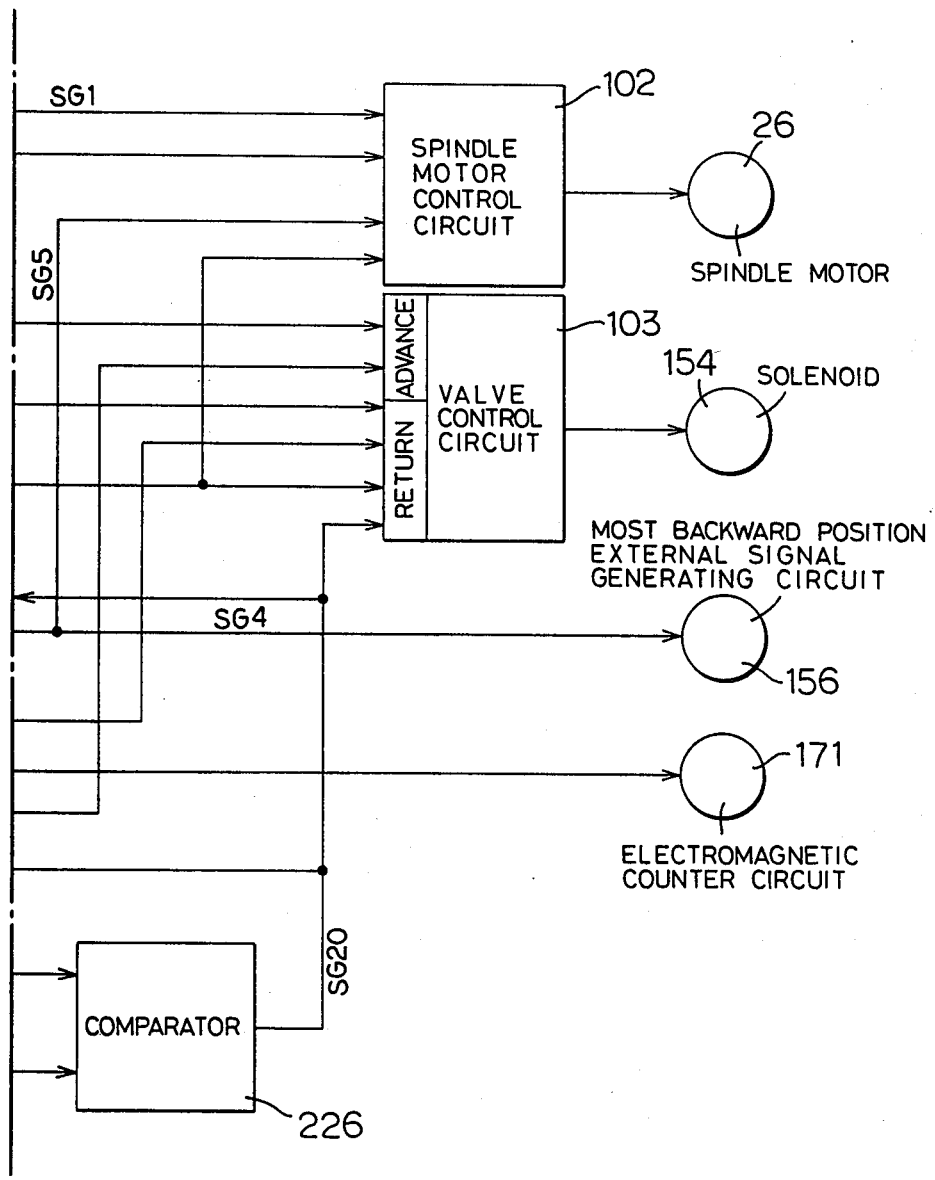
Figure 16:
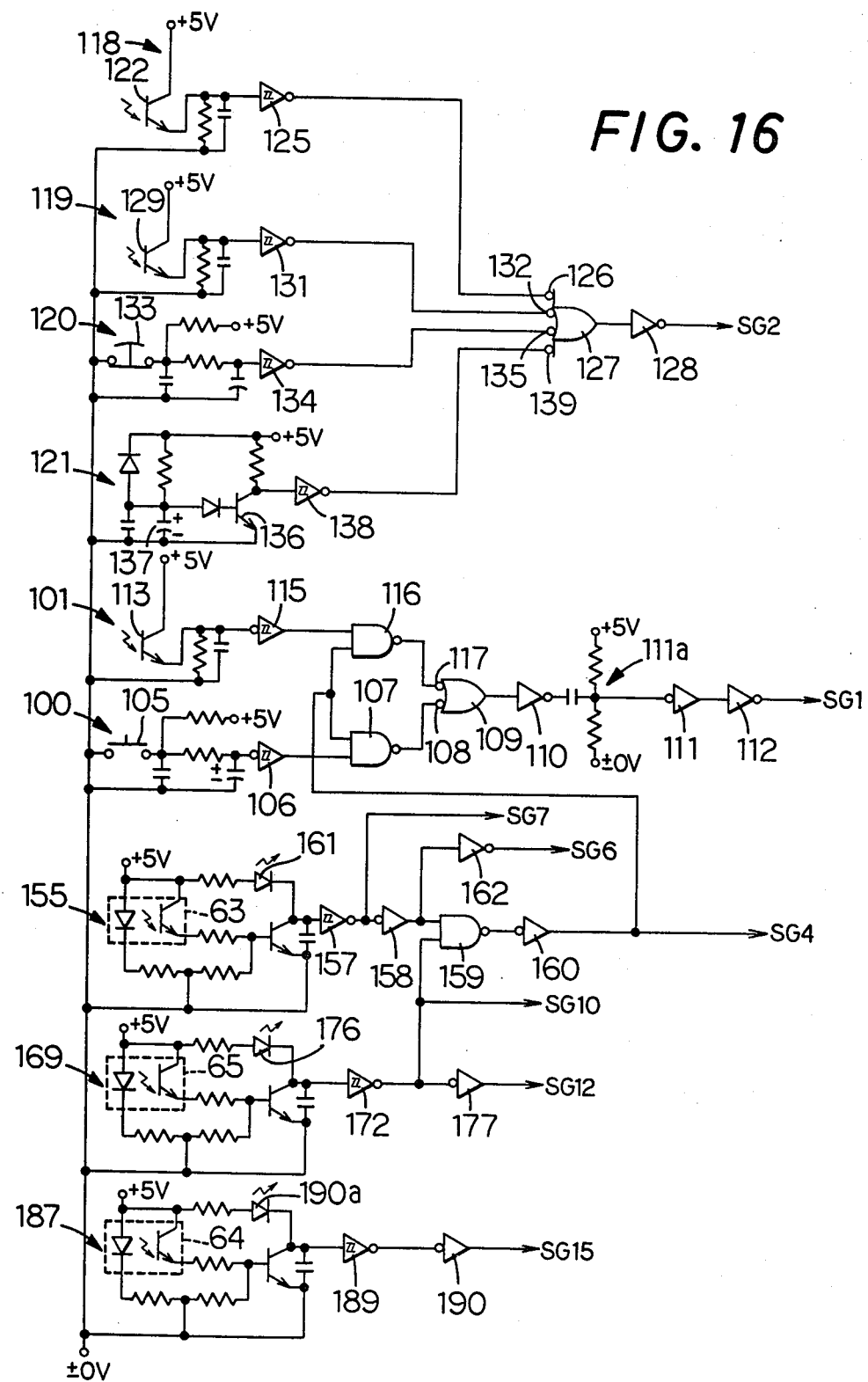
FIGS. 16 through 21 are electrical circuit diagrams showing concrete circuit build-up of the drive control unit.

In FIG. 15, a starter circuit 100 or an external starter circuit 101 is turned on in the state of the drill 1 being in the most backward position (origin) O, thereby outputting a control signal SG1 at a zero potential (hereinafter referred to as the "L level") to a spindle motor control circuit 102 and also through a delay circuit 104 to an air cylinder switching solenoid valve control circuit (hereinafter referred to as the "valve control circuit") to turn on the spindle motor 26 and advance the drill 1. As shown in FIG. 16, by turning on a starting switch 105 of the starter circuit 100, this "on" signal is output as the control signal SG1 at the L level through a NOT circuit 106, a NAND circuit 107, a NOT circuit 108, an OR circuit 109 a NOT circuit 110, a differentiation circuit 111a, and NOT circuits 111, 112 to the spindle motor control circuit 102 and to the delay circuit 104.

In the external starter circuit 101, a phototransistor 113 is turned off upon turning off of a light emitting diode 114 (see FIG. 21) which goes on and off in synchronism with external signals, and this "off" signal is output also as the control signal SG1 at the low level through a NOT circuit 115, a NAND circuit 116, a NOT circuit 117, the OR circuit 109, the NOT circuit 110, the differentiation circuit 111a, the NOT circuits 111 and 112.

A motor overheat detecting circuit 118, an external emergency return circuit 119, an emergency return circuit 120 and a reset circuit 121 each outputs a control signal SG2 at the L level to the spindle motor control circuit 102 and the valve control circuit 103 to stop the spindle motor 26 and return the drill 1. In the motor overheat detecting circuit 118, as shown in FIG. 16, a phototransistor 122 in the detecting circuit 118 is turned on by light emission of a light emitting diode 123 shown in FIG. 21 (a thermal detector 124 disposed in the vicinity of the spindle motor 26 is turned off upon detection of overheat of the motor 26, thus causing the light emitting diode 123 to emit light), and this "on" signal is output as the control signal SG2 at the L level through NOT circuits 125 and 126, an OR circuit 127 and a NOT circuit 128.

Figure 21:
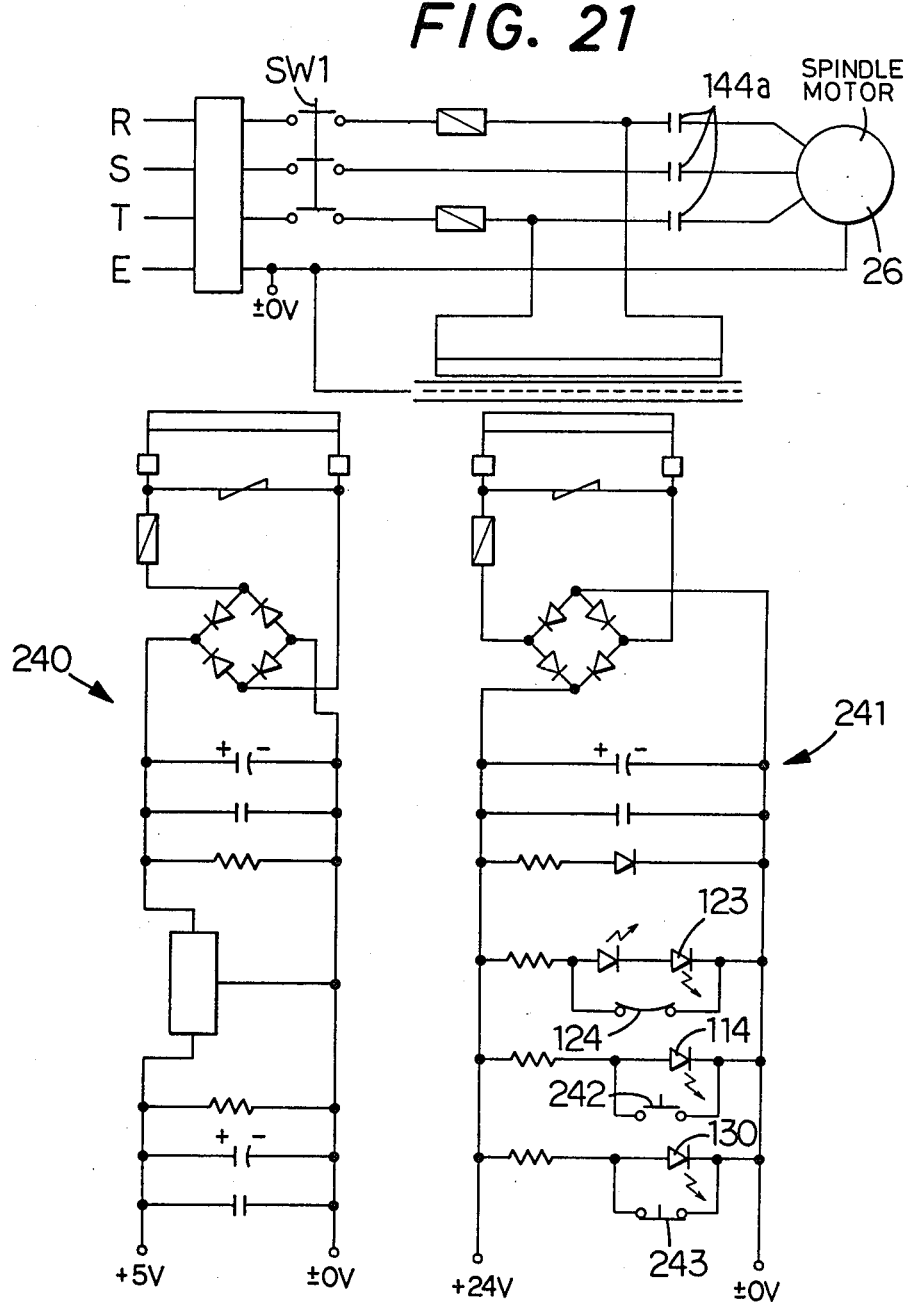

A phototransistor 129 in the external emergency return circuit 119 is turned on by light emission of a light emitting diode 130 shown in FIG. 21 which goes on and off in synchronism with external emergency return signals, and this "on" signal is output through NOT circuits 131 and 132, the OR circuit 127, and the NOT circuit 128 as the control signal SG2 at the L level. By turning off an emergency stop switch 133 in the emergency return circuit 120, a signal at a positive potential (hereinafter referred to as the "H level") is applied through NOT circuits 134 and 135 to the OR circuir 127, and in the same manner as above the control signal SG2 at the L level is output through the NOT circuit 128 of the following stage.

When a power switch SW1 shown in FIG. 21 is turned on and power is fed from a constant-voltage power supply circuit of plus 5 volts, a transistor 136 in the reset circuit 121 turns off immediately, and after lapse of a predetermined time it is turned on as a capacitor 137 is charged. The "off" signal at the time of power application is output through NOT circuits 138 and 139, the OR circuit 127, and the NOT circuit 128 as the control signal SG2 at the L level.

Figure 17:
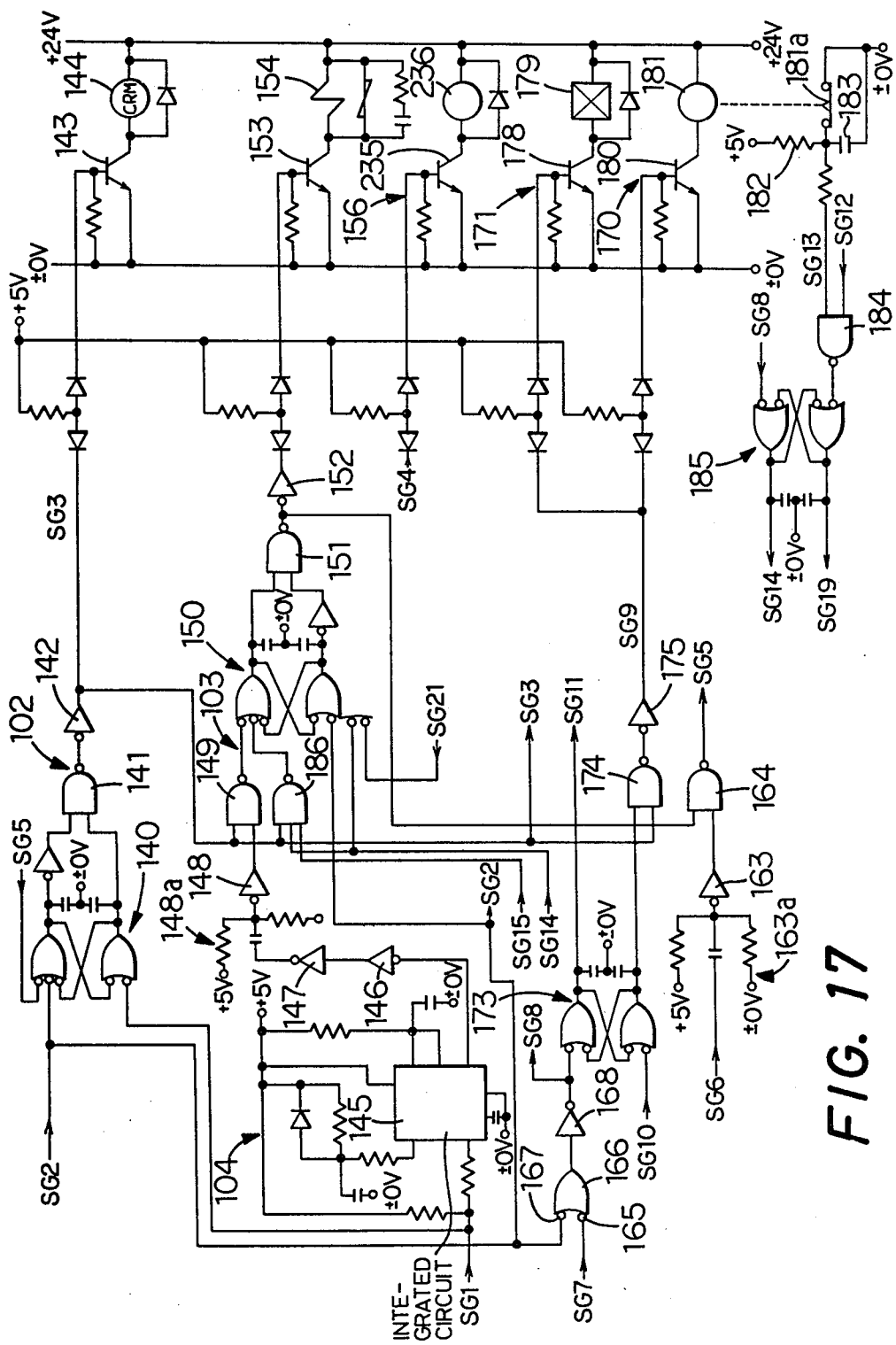

The spindle motor control circuit 102 is shown in FIG. 17. When the aforesaid L-level control signal SG1 is fed to the reset side input terminal of a flip-flop circuit 140 in the circuit 102, the output of the next-stage NAND circuit 141 becomes L level and the next-stage NOT circuit 142 outputs a control signal SG3 at the H level. In response to the H-level control signal SG3 a transistor 143 is turned on to energize a coil 144 of an electromagnetic contactor, thus causing contacts 144a of the contactor shown in FIG. 21 to be closed for supplying a three-phase alternating current to the spindle motor 26 to drive the latter.

Conversely, when the L-level control signal SG2 is fed to the set side input terminal of the flip-flop circuit 140, the flip-flop circuit 140 is inverted and the NOT circuit 142 outputs the control signal SG3 at the L level to the base terminal of the transistor 143, so that the coil 144 is de-energized and the motor 26 is interrupted from the power supply to cease rotation thereof.

In the delay circuit 104, as shown in FIG. 17, the L-level control signal SG1 is input to an integrated circuit 145. The integrated circuit 145 has a delaying function whereby the control signal SG1 is delayed by one second and is output in such a delayed state. The control signal SG1 thus delayed by one second becomes H level through NOT circuits 146, 147, a differentiation circuit 148a and a NOT circuit 148, and this H-level control signal SG1 is input to the valve control circuit 103.

In the valve control circuit 103, the H-level control signal SG3 provided from the spindle motor control circuit 102 and the delayed H-level control signal SG1 from the delay circuit 104 are input to a NAND circuit 149, whereupon the next-stage flip-flop circuit 150 is inverted and its reset side output terminal becomes H level, so that a control signal at H level is output to the base terminal of a transistor 153 through a NAND circuit 151 and a NOT circuit 152. In response to this H-level control signal a transistor 153 is turned on to energize a solenoid 154 of a solenoid valve (not shown) for switching the operation of the solenoid valve to supply air into the air cylinder chamber 7 through the first passage 9, thereby advancing the drill 1.

Conversely, if the L-level control signal SG2 is fed to the set side input terminal of the flip-flop circuit 150, the flip-flop circuit 150 is inverted and an L-level control signal is output through the NOT circuit 152, so that the solenoid 154 is de-energized and the solenoid valve is thereby switched to allow air to be supplied into the cylinder chamber 7 through the second passage 10, thereby moving the drill 1 backward.

Therefore, if the L-level control signal SG1 is output from the starter circuit 100 or from the external starter circuit 101, that is, if the starting switch 105 is turned on or the phototransistor 113 is turned off with an external signal, while the spindle motor 26 is halted and the drill 1 is in the most backward position (origin) O, the spindle motor 26 immediately starts operation, and one second later the drill 1 starts advancing. Conversely, for example, if the emergency return switch 133 in the emergency return circuit 120 is depressed during forward movement of the drill 1, the spindle motor 26 is immediately turned off and at the same time the drill 1 starts moving backward for returning to the most backward position or origin O.

In FIG. 15, a most backward position detecting circuit 155 comprises the photocoupler 63 for detecting the most backward position O, in which when the drill 1 has returned to the most backward position O (when the rear shutter piece 68 has shut the photocoupler 63), a control signal SG4 at H level is output to a most backward position external signal generating circuit 156, which generates an external signal for controlling the operation of other external devices (e.g. a workpiece conveying device), and also a control signal SG5 at L level is applied to the spindle motor control circuit 102. As shown in FIG. 16, when the photocoupler 63 is turned off, this "off" signal is output as the H-level control signal SG4 through NOT circuits 157, 158, a NAND circuit 159 and a NOT circuit 160 to the most backward position external signal generating circuit 156 and also to the NAND circuits 107 and 116 in the starter circuit 100 and in the external starter circuit 101, respectively. A light emitting diode 161 goes off upon turning off of the photocoupler 63, thereby indicating to the worker that the drill 1 is in the most backward position O.

The signal output of the NOT circuit 158 becomes a control signal SG6 at the L level through a NOT circuit 162 when the photocoupler 63 is off, and as shown in FIG. 17 the L-level control signal SG6 is input through a differentiation circuit 163a and a NOT circuit 163 to a NAND circuit 164 of the next-stage. Not only the control signal SG6 is input to the NAND circuit 164 through the NOT circuit 163, but also a signal output of the NAND circuit 151 of the valve control circuit 103 is input to the NAND circuit 164, and when the drill 1 is in its returned state to the most backward position O, the NAND circuit 164 outputs the L-level control signal SG5 to the reset side input terminal of the flip-flop circuit 140 in the spindle motor control circuit 102. Therefore, upon return to the most backward position O of the drill 1, the spindle motor 26 is halted.

An output signal SG7 from the NOT circuit 157 shown in FIG. 16 is input through a NOT circuit 165 shown in FIG. 17 to an OR circuit 166. When the output signal SG7 is input through the NOT circuit 165 or when the control signal SG2 is input through a NOT circuit 167, that is, when the L-level control signal SG2 is input or when the drill 1 has returned and the L-level output signal SG7 is input, the OR circuit 166 outputs through a next-stage NOT circuit 168 a signal SG8 at L level, or at the H level when the drill 1 has been moved forward from the most backward position O.

In FIG. 15, a most forward position detecting circuit 169 comprises the photocoupler 65 shown in FIG. 16 for detecting the most forward position or machining end R. When the drill 1 has advanced up to the most forward position R, a control signal SG9 at H level is output to a delay circuit 170 and to an electromagnetic counter circuit 171, which counts the number of workpieces machined. As shown in FIG. 16, when the photocoupler 65 is turned off, this "off" signal as an output signal SG10 at L level is output through a NOT circuit 172 to the set side input terminal of a flip-flop circuit 173 shown in FIG. 17. The flip-flop circuit 173 has been inverted on the basis of the L-level output signal SG8 which was previously input from the NOT circuit 168, and its reset side output SG11 is held at H level and its set side output is held at L level, so that in response to the output signal SG10 the flip-flop circuit 173 is inverted and outputs an H-level signal to a NAND circuit 174 of the next-stage. At this time, to one input terminal of the NAND circuit 174 there is input the H-level control signal SG3 (because the drill 1 is in forward movement) from the spindle motor control circuit 102, so that the NAND circuit 174 outputs the H-level control signal SG9 through a NOT circuit 175 of the next-stage. When the drill 1 has returned from the most forward position (machining end) R to the most backward position O and the spindle motor 26 halted, the control signal SG9 is changed from H level to L level since the L-level control signal SG3 is input to the NAND circuit 174. In case the emergency return switch 133 is depressed during machining, the drill 1 is returned before advancing up to the most forward position R, so that the flip-flop circuit 173 is not inverted and the control signal SG9 is held at H level without becoming L level.

A light emitting diode 176 in the most forward position detecting circuit 169 turns on when the photocoupler 65 is turned on, and it goes off when the photocoupler 65 is turned off thereby providing indication to the worker that the drill 1 has advanced up to the most forward position R, that is, the machining for the workpiece is over. The NOT circuit 172 shown in FIG. 16 outputs through a NOT circuit 177 a control signal SG12, which becomes H level when the photocoupler 65 is off and becomes L level when the photocoupler 65 is on.

In the electromagnetic counter circuit 171, as shown in FIG. 17, a transistor 178 is turned on upon input of one H-level control signal SG9 to its base terminal to actuate an electromagnetic counter 179 whereby the number of work-pieces machined is indicated to the worker at every completion of machining.

In the delay circuit 170, the H-level control signal SG9 is input to the base terminal of a transistor 180 and the transistor 180 is turned on in response to the H-level control signal SG9; as a result, after the lapse of a preset time (0.5 to 10 seconds), an electromagnetic timer 181 opens a normally closed contact 181a whereby the potential of the juncture, which is formed in a series circuit of a resistor 182 and a capacitor 183 rises before being output as a delayed H-level signal SG13 to a NAND circuit 184. Thus, at the most forward position R the axial movement of the drill 1 is stopped for a preset interval of time in its rotating state, and therefore a machined bore having a predetermined length is sure to be obtained.

To the NAND circuit 184 there has previously been input the H-level control signal SG12 from the NOT circuit 177, so upon input of the H-level output signal SG13, the NAND circuit 184 provides an L-level output signal to the set side input terminal of a flip-flop circuit 185 of the next-stage. The flip-flop circuit 185 has been inverted on the basis of the L-level control signal SG8 previously input from the NOT circuit 168, and its reset side and set side outputs are held at H and L levels, respectively, so in response to the L-level output signal provided from the NAND circuit 184 the flip-flop circuit 185 is inverted for respectively changing its reset side and set side outputs to L and H levels. This reset side output is input as an L-level control signal SG14 to a NAND circuit 186 in the valve control circuit 103 as well as to the set side input terminal of the flip-flop circuit 150 thereby inverting the flip-flop circuit 150 so as to de-energize the solenoid 154.

The drill 1 which has been advanced up to the most forward position R, is therefore started after lapse of a predetermined time of halting there (0.5 to 10 seconds) set by the electromagnetic timer 181 returning toward the most backward position O. When the drill 1 has been completely returned to the most backward position the spindle motor 26 is halted.

A turning point detecting circuit 187 shown in FIG. 15 includes, as shown in FIG. 16, the photocoupler 64 for detecting the turning point Q, and when the drill 1 has moved back to the turning point Q, the turning point detecting circuit 187 outputs an H-level control signal SG15 to the valve control circuit 103 and also to a latch signal generator 188. As shown in FIG. 16, when the photocoupler 64 is turned off, this "off" signal is output as the H-level control signal SG15 through NOT circuits 189 and 190 to the NAND circuit 186 in the valve control circuit 103 shown in FIG. 17.

When the drill 1 has reached the turning point Q by being moved back from the machining position P on the basis of a coincidence signal SG20 which had been output previously from a comparator 226 as will be described later, the H-level control signal SG15 is input to the NAND circuit 186 shown in FIG. 17 (the control signals SG3 and SG14 both being at the H level), so that the drill 1 is immediately reversed at the turning point for an immediate advance movement. When the drill 1 returns to the most backward position O from the most forward position R, or from the machining position P in the case of an emergency return, etc., the photocoupler 64 is turned off and the H-level control signal SG15 is input to the NAND circuit 186, but since one of the control signals SG14 and SG3 becomes L level, the drill 1 is returned to the most backward position O without being stopped at the turning point Q. A light emitting diode 190a in the detecting circuit 187 turns off upon turning off of the photocoupler 64, thereby indicating to the worker that the drill 1 has returned to the turning point Q and is about to start advancing again.

Figure 19:
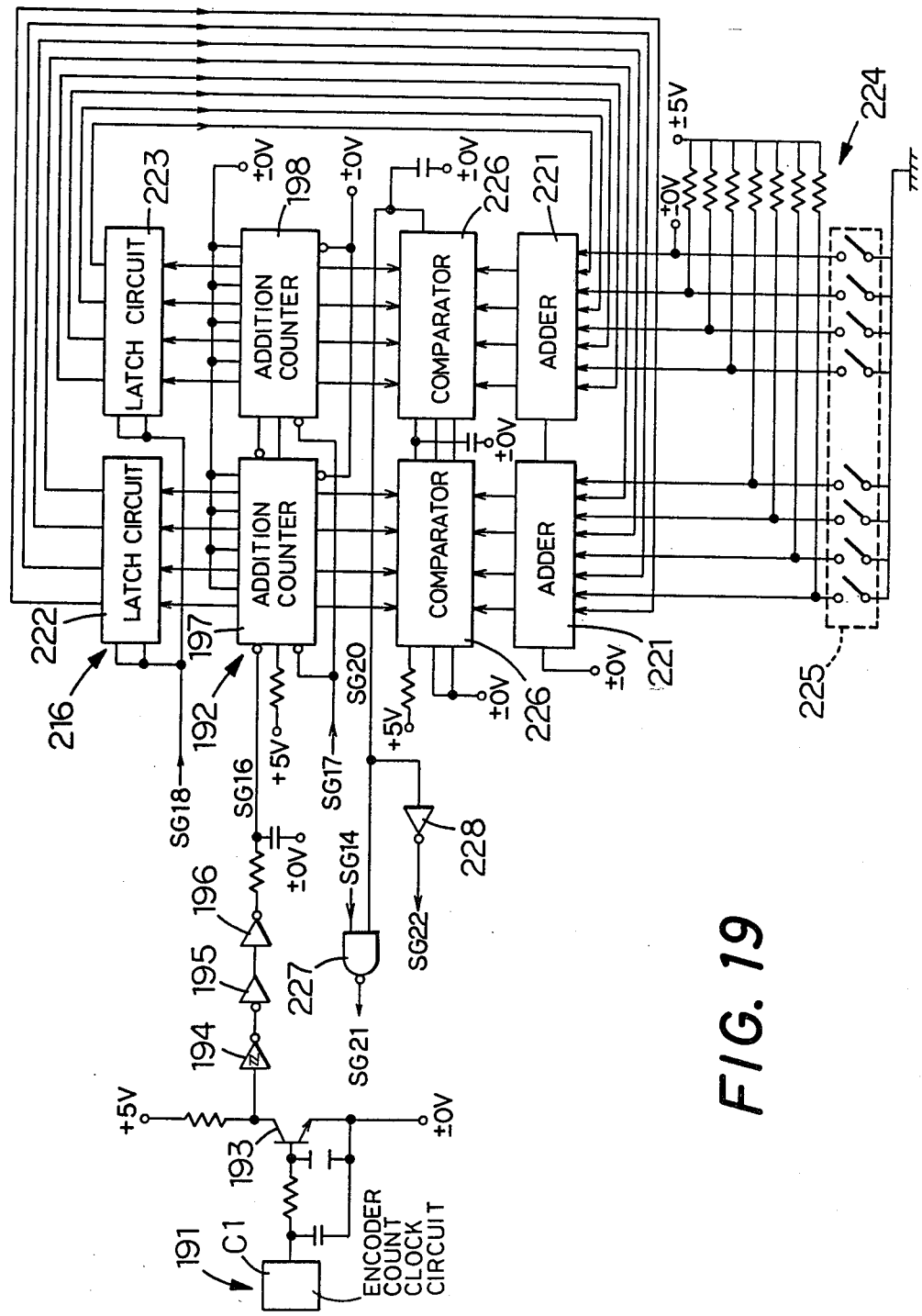
Figure 20:
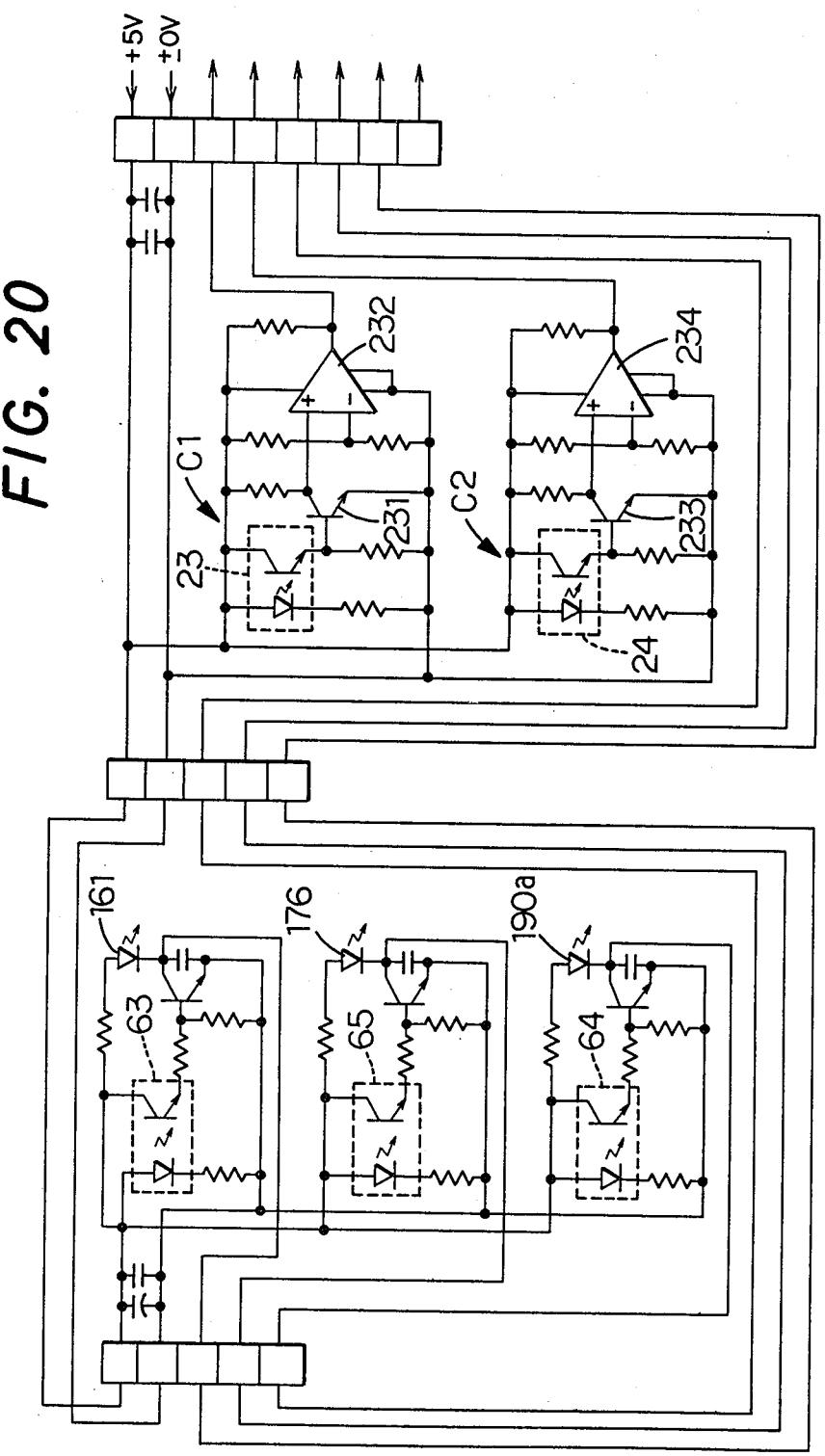

An angular displacement pulse signal generating circuit 191 shown in FIG. 15 comprises an encoder count clock circuit C1 shown in FIGS. 19 and 20 for detecting the cutting torque of the drill 1, the circuit C1 including the angular displacement detecting photocoupler 23, and it outputs to a counter circuit 192 a pulse signal SG16 continuously by the number corresponding to that of the slits 21a of the wheel disk 21 not being under cover of the shutter disk 22 at every rotation of the spindle 4. As shown in FIG. 19, a transistor 193 in the angular displacement pulse signal generating circuit 191 is turned on and off according as the photocoupler 23 in the encoder count clock circuit C1 repeats on and off continuously in response to the above slits 21a. The "on" and "off" signals from the transitor 193 are output as the pulse signal SG16 through the following stage NOT circuits 194, 195 and 196.

The counter circuit 192 comprises two addition counters 197 and 198 as is shown in FIG. 19 whereby the pulse signal SG16 train is addition-counted successively. Therefore, the counted value or content corresponds to the rotational torque value (Bx) for each rotation of the drill 1.

In FIG. 15, a counter reset circuit 199 comprises an encoder reset circuit C2 (see FIG. 18) which includes the resetting photocoupler 24 shown in FIG. 20 and detects the reference hole 22c of the shutter disk 22 for resetting the counted value or content of the addition counters 197 and 198. The photocoupler 24 is turned on by the passing of the reference hole 22c which passes at every rotation of the rotary sleeve 13, and this "on" signal is output as a reset signal SG17 to the counter circuit 192. Upon passing of the reference hole 22c the encoder reset circuit C2 outputs "on" and "off" signals whereby the next-stage transistor 200 is turned on and off, and the output signals based on the on and off of the transistor 200 are input through the next-stage NOT circuits 201–204 to a differentiation circuit 205a, and when the transistor 200 is turned on from its off state, an H-level pulse signal of a predetermined width is input to an OR circuit 208 of the next-stage through NOT circuits 205, 206 and 207. While the spindle motor 26 is in operation (the control signal SG2 is at H level), the OR circuit 208 outputs the H-level reset signal SG17 to the addition counters 197 and 198 through a NOT circuit 209 of the next-stage, and upon subsequent turning off of the transistor 200 the reset signal SG17 falls to L level.

Therefore, the addition counters 197 and 198 are input the reset signal SG17 for every rotation of the rotary sleeve 13, and when this signal has fallen from its H level state to L level, the counted contents (Bx) (rotational torque of the drill 1) counted at every rotation of the drill 1 are all cleared.

Figure 18:
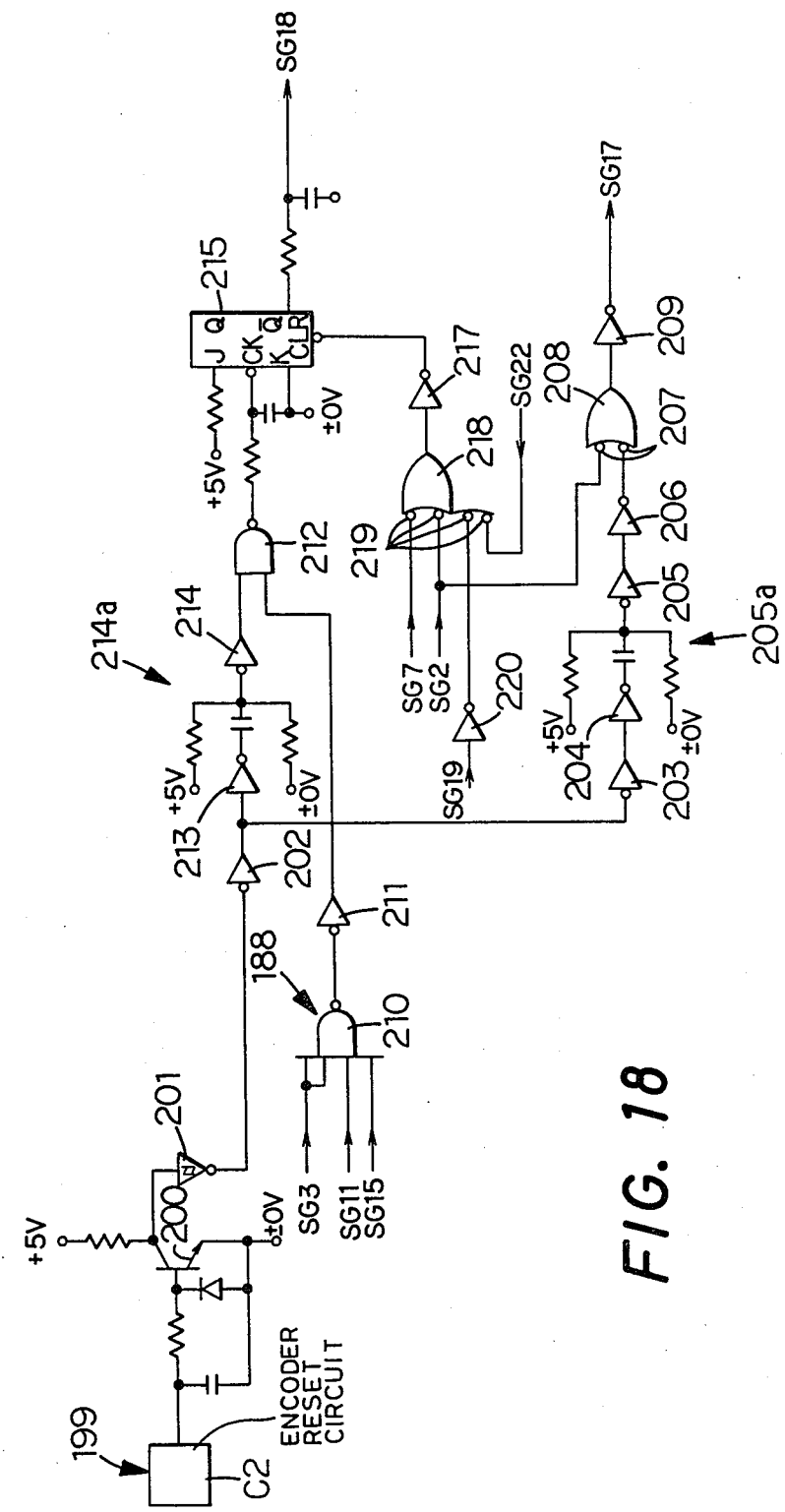

In FIG. 15, the latch signal generator 188 outputs an H-level latch signal SG18 in response to the H-level control signal SG15 provided from the turning point detecting circuit 187, and as shown in FIG. 18, to a NAND circuit 210 in the generator circuit 188 there are input the control signal SG3 from the spindle motor control circuit 102, the output signal SG11 from the flip-flop circuit 173 in the most forward position detecting circuit 169 and the control signal SG15 from the turning point detecting circuit 187.

When along with operation of the spindle motor 26 the drill 1 has advanced from the most backward position O to the machining position P or returned from the machining position P to the turning point Q for turning the control signal SG15 to H level, that is, when the drill 1 has passed or moved back up to the turning point Q, the NAND circuit 210 outputs an H-level signal to a NAND circuit 212 of the next-stage through a NOT circuit 211. At this time, that is, when the drill 1 is at the turning-point Q and the H-level output signal provided from the NOT circuit 202 in response to turning on of the transistor 200 is output to the NAND circuit 212 through a NOT circuit 213, a differentiation circuit 214a and a NOT circuit 214, the NAND circuit 212 outputs an L-level signal to a Ck input terminal of a flip-flop circuit 215 of the following stage. Upon catching the fall of this L-level output signal the flip-flop circuit 215 is inverted and outputs from its reset terminal $\overline{Q}$ an L-level latch signal SG18 to a memory circuit 216 shown in FIG. 15. When the L-level control signal SG2 and output signal SG7 are input through NOT circuits 219, an OR circuit 218 and a NOT circuit 217 to a CLR input terminal of the flip-flop circuit 215, and when the L-level output signal SG19 provided from the set side output terminal of the flip-flop circuit 185 in the delay circuit 170 is input through a NOT circuit 220 to the CLR input terminal of the flip-flop circuit 215, the output of the reset terminal $\overline{Q}$ of the flip-flop circuit 215 is inverted to the H level.

The memory circuit 216 in FIG. 15 catches the fall to L level of the latch signal SG18 from the latch signal generator 188, whereupon it temporarily stores the counted contents of the counter circuit 192 and outputs its contents to an adder 221. As shown in FIG. 19, the memory circuit 216 comprises two latch circuits 222 and 223. The latch circuits 222 and 223 catch the fall of the latch signal SG18, store the counted contents (Bx) of the addition counters 197 and 198, respectively, and output their contents to the adder 221 as will be described later.

The falling time of the latch signal SG18 is earlier than the falling time of the reset signal SG17 for clearing the addition counters 197 and 198, and therefore the latch circuits 222 and 223 will never store the cleared state of the addition counters 197 and 198 (that is, when the photocoupler 24 begins detecting the reference hole 22c the L-level latch signal SG18 is output, and thereafter when the reference hole 22c has passed the photocoupler 24 and the latter no longer detects the reference hole 22c there is output the L-level reset signal SG17). Therefore, in the latch circuits 222 and 223, when the drill 1 is positioned at the turning point Q, that is, when the drill 1 is in a state of a stable rotational torque (hereinafter referred to as the "minimum reference torque") with no cutting torque applied thereto, there are latched the counted contents (hereinafter referred to as the "minimum reference torque value (Bo)") of the addition counters 197 and 198.

A torque difference setter 224 shown in FIG. 15 is for setting a torque difference (A) obtained by subtracting the minimum reference torque value (Bo) from the maximum allowable torque value (B$_1$) at which the drill 1 is not broken with the cutting torque. As shown in FIG. 19, the torque difference setter 224 comprises a changeoverable rotary switch 225, and by operating the switch 225 the torque difference (A) is coded into 8 bits, which are output to the adder 221.

The adder 221, as shown in FIG. 19, adds the minimum reference value (Bo) stored in the latch circuits 222, 223 and the torque difference (A) to obtain the allowable torque value (B$_1$), and this value (B$_1$) is output to a comparator 226.

Upon input of the allowable torque value (B$_1$), the comparator 226 compares the magnitude of the value (B$_1$) with that of the rotational torque value (B$_x$) of the drill 1 output anew from the addition counters 197 and 198 at every rotation of the spindle 4. And when the rotational torque value (B$_x$) has become equal to the allowable torque value (B$_1$), that is, when a cutting torque which may possibly lead to breakage of the drill 1 has been applied to the drill 1 during the cutting operation, the comparator 226 outputs an H-level coincidence signal SG20 to a NAND circuit 227 of the following stage. To one input terminal of the NAND circuit 227 there is input the H-level control signal SG14 from the flip-flop circuit 185 in the delay circuit 170, so in response to the H-level coincidence signal SG20 the NAND circuit 227 outputs a return signal SG21 to the set side input terminal of the flip-flop circuit 150 in the valve control circuit 103 shown in FIG. 17, thereby switching the solenoide valve so as to retreat the drill 1.

Thus, if a cutting torque corresponding to the allowable torque value ($B_1$) is applied to the drill 1 during the drilling operation, the drill 1 immediately stops operation and is moved backward, being perfectly prevented from the breakage.

The coincidence signal SG20 is output as a reset signal SG22 through a NOT circuit 228 to the OR circuit 218 in the latch signal generator 188 shown in FIG. 18, so that the latch signal SG18 from the flip-flop circuit 215 becomes H level and the storage contents of the latch circuits 222 and 223, i.e. the minimum reference value (Bo), are cleared for being replaced by a new minimum reference value (Bo).

The encoder count clock circuit C1 and the encoder reset circuit C2 will be explained in detail hereinunder with reference to FIG. 20.

When the angular displacement detecting photocoupler 23 in the encoder count clock circuit C1 is turned on and off at every passing of the slit 21a of the wheel disk 21, as previously stated, a transistor 231 of the next-stage is turned on and off in response thereto, and output signals based on the on and off operation of the transistor 231 are fed to an operational amplifier 232. An output signal from the operational amplifier 232 is wave-shaped and becomes L level when the photocoupler 23 is turned on and H level when the photocoupler 23 is turned off, thereby allowing the transistor 193 shown in FIG. 19 to operate.

The encoder reset circuit C2 is of just the same circuit build-up as the encoder count clock circuit C1, wherein output signals from the resetting photocoupler 24 which is turned on and off at every passing of the reference hole 22c of the shutter disk 22 are wave-shaped through the following-stage transistor 233 and operational amplifier 234 so as to be output to the base terminal of the transistor 200 shown in FIG. 18.

In the most backward position external signal generating circuit 156 which outputs external signals for controlling the operation of external device, as shown in FIG. 17, when the H-level control signal SG4 is input, a transistor 235 is turned on to energize a coil 236 of an electromagnetic relay mounted in an electric circuit of the external device, thereby opening or closing the contact of the relay to control the operation of the external device.

A step number counter 237 shown in FIG. 15 is a downcounter whereby, in case drilling is not completed even if the drill 1 advances and returns oftener times than necessary for one workpiece, it is judged that the drill 1 has been worn out, and there is output an abnormal signal SG23. In response to the signal SG23 the drill 1 is returned to the most backward position O and the spindle motor 26 is stopped, and at the same time an indicator 238 is operated for providing an indication to the worker. That is, allowable number of times are preset to the step number counter 237 by means of an abnormal step number setter 239, and the set number of times are counted down one by one every time the coincidence signal SG20 is input from the comparator 226 and when "0" has been reached, the abnormal signal SG23 is output. In case the machining of one workpiece is over within the allowable number of times, the output signal SG7 from the most backward position detecting circuit 155 is input to the step number counter 237 to reset the latter.

A +5 V power supply circuit 240 and a +24 V power supply circuit 241, both being used in the drive control unit, will be briefly described hereinunder with reference to FIG. 21.

The power supply circuits 240 abd 241 are known circuits wherein, upon turning on of the power switch SW1, +5 V and +24 V direct current supply is made to the starter circuit 100, the valve control circuit 103, etc. The light emitting diode 114 in the external starter circuit 101 and the light emitting diode 130 in the external emergency return circuit 119 are respectively connected between output terminals of the +24 V power supply circuit 241, and contacts 242 and 243 which are closed or opened respectively with an external starting signal and an external emergency return signal are parallelly connected thereto. The light emitting diodes 114 and 130 are adapted to emit light upon opening of the contacts 242 and 243, respectively.

The following description is now provided about the operation of the drive control unit having the above construction.

Turning on the power switch SW1 allows an operating direct current to be supplied to each circuit, whereby the L-level control signal SG2 is output from the reset circuit 121 to reset the flip-flop circuits 140, 150, 173, 185 and 215, and the drive control unit is initialized. Then, after setting torque difference (A) by means of the rotary switch 225 of the torque difference setter 224 an allowable number of times by means of the abnormal step number setter 239, the starting switch 105 is turned on, whereupon the flip-flop circuit 140 in the spindle motor control circuit 102 is inverted with the L-level control signal SG1 provided from the starter circuit 100, and the spindle motor 26 is started. On the other hand, the flip-flop circuit 150 in the valve control circuit 103 is also inverted with the one-second delayed control signal SG1 provided through the delay circuit 104, and the solenoid 154 is thereby energized, so that the drill 1 is rotated by the spindle motor 26 and started one second latter advancing from the most backward position or origin.

In this state, the counter circuit 192 counts the number of pulse signals SG16 provided from the angular displacement pulse signal generator 191 to determine the rotational torque value (Bx) for each rotation of the drill 1, but at this time the drill 1 has not yet passed the turning point Q in its forward movement and the latch signal SG18 has not yet been output from the latch signal generator 188, and therefore the memory circuit 216 does not store the rotational torque value (Bx) as the minimum reference value (Bo).

Subsequently, when the rotational torque has become stable and the drill 1 has advanced past the turning point Q, the turning point detecting circuit 187 outputs the control signal SG15, and in response to this control signal SG15 the latch signal generator 188 outputs the latch signal SG18 to the memory circuit 216, which in turn stores immediately the counted contents of the counter 192, namely, the rotational torque (Bx) in an unloaded state, with the cutting torque not being applied, as the minimum reference value (Bo), and at the same time outputs this value to the adder 221. The adder 221 adds the minimum reference value (Bo) and the torque difference (A) so as to obtain the allowable torque value ($B_1$), and this value ($B_1$) is set to the next-stage comparator 226.

Once cutting is started with the drill 1, it moves forward while undergoing the cutting torque. While the rotational torque (Bx) including the cutting torque applied to the drill 1 is below the allowable torque value (B1), the cutting is continued, but when a large cutting torque is applied to the drill 1 and the counter circuit 192 counts a pulse number corresponding to a rotational torque value (Bx) equal to the allowable torque value (B1), the comparator 226 immediately outputs the coincidence signal SG20.

In response to the coincidence signal SG20, the flip-flop circuit 150 in the valve control circuit 103 is inverted, so that the solenoid 154 is de-energized for switching the solenoid valve to return the drill 1. Thus cutting is discontinued before the drill 1 is broken, so that troubles related to the drill breakage may be evaded. The latch signal generator 188 is reset upon receipt of the coincidence signal SG20.

When the drill 1 has been returned up to the turning point Q, the control signal SG15 is output from the turning point detecting circuit 187 and, in the same manner as the foregoing, the latch signal generator 188 outputs the latch signal SG18 and in response to the latch signal SG18 the memory circuit 216 stores a new minimum reference value (Bo) in an unloaded state of the drill 1 positioned at the turning point Q. A new allowable torque value (B1) is set to the comparator 226 on the basis of the reference value (Bo).

Furthermore, the control signal SG15 is applied to the flip-flop circuit 150 in the valve control circuit 103 thereby inverting the flip-flop circuit 150, so that the drill 1 changes its movement from backward to forward at the turning point Q and again performs drilling. During this drilling operation the rotational torque (Bx) of the drill 1 is compared with the new allowable torque value (B1) by the comparator 226, and upon coincidence of the former with the latter, the comparator 226 outputs the coincidence signal SG20 to return the drill 1 in the same manner as previously stated. Thereafter, until the drilling for the workpiece is completed, the drill 1 is moved forward and backward without being broken in the same way as hereinbefore described.

When the drilling for the workpiece is over, that is, when the drill 1 has reached the most forward position R, there is output the control signal SG9 from the most forward position detecting circuit 169, and the valve control circuit 103 responds to the control signal SG9 through the delay circuit 170 to de-energize the solenoid 154 thereby switching the solenoid valve to return the drill 1 up to the most backward position O. When the drill 1 has reached the most backward position O, the spindle motor 26 is stopped with the control signal SG5 provided from the most backward position detecting circuit 155, and the drill 1 is ready for the next drilling at the most backward position O.

Thus, in this embodiment, a relative angular displacement between the wheel disk 21 and the shutter disk 22, both disposed in the vicinity of the drill 1, is electrically measured to detect the rotational torque of the drill 1, so that a true variation in the rotational torque of the drill 1 due to changes of the cutting torque can always be detected exactly without being affected by a large variation in the motor load current created at starting of the spindle motor 26, or by variations in the motor load current due to variations in external power supply or changes in the winding resistance of the motor.

TABLE 1

| TIME | PULSE NUMBER | AC CURRENT (mA) |
| --- | --- | --- |
| (Start) | 60 | 2000 |
| 1 sec. | 40 | 1400 |
| 2 | ↓ | 1300 |
| 3 | ↓ | 1250 |
| 4 | ↓ | 1240 |
| 5 | ↓ | 1250 |
| 6 | ↓ | 1220 |
| 7 | ↓ | 1240 |
| 8 | ↓ | 1200 |
| 9 | ↓ | 1220 |
| 10 | ↓ | 1200 |
| 15 | 39 | 1150 |
| 30 | ↓ | 1110 |
| 1 min. | 38 | 1020 |
| 2 | ↓ | 980 |
| 3 | ↓ | 950 |
| 4 | ↓ | 980 |
| 5 | 37 | 920 |
| 10 | 36 | 900 |
| 15 | ↓ | |
| 20 | ↓ | |
| 25 | ↓ | |
| 30 | (No variation) | |

TABLE 2

| VARIATION OF PULSE NUMBER | VARIATION IN LOAD CURRENT OF MOTOR |
| --- | --- |
| 1 | 2 |
| 2 | 5 |
| 3 | 8 |
| 4 | 10 |
| 5 | 13 |
| 6 | 17 |
| 7 | 22 |
| 8 | 23 |
| 9 | 26 |
| 10 | 28 |
| 15 | 60 |
| 20 | 90 |
| 30 | 180 |

Figure 22:
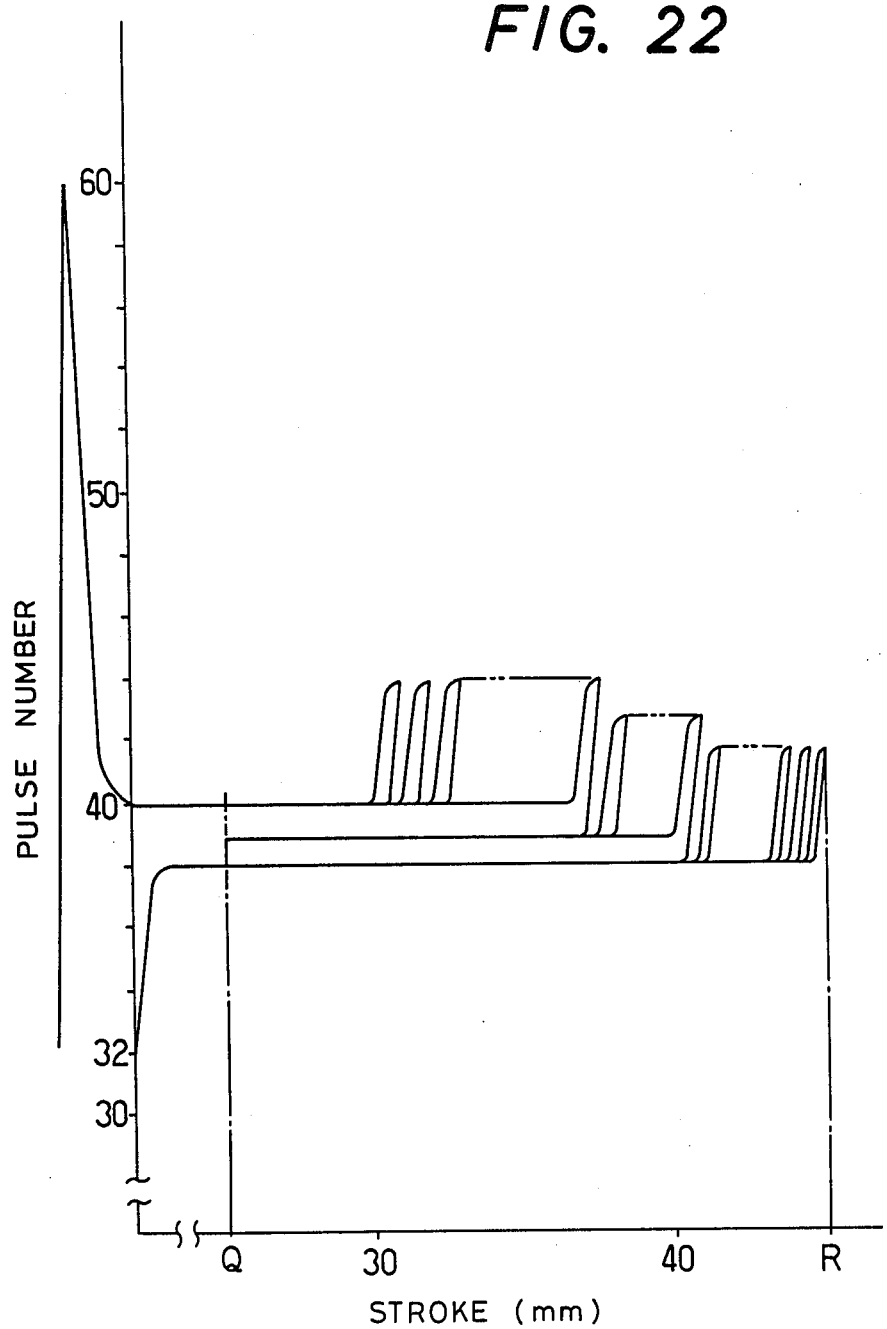
FIG. 22 is a diagram showing changes in the number of pulses during one cycle drilling operation.
Figure 23:
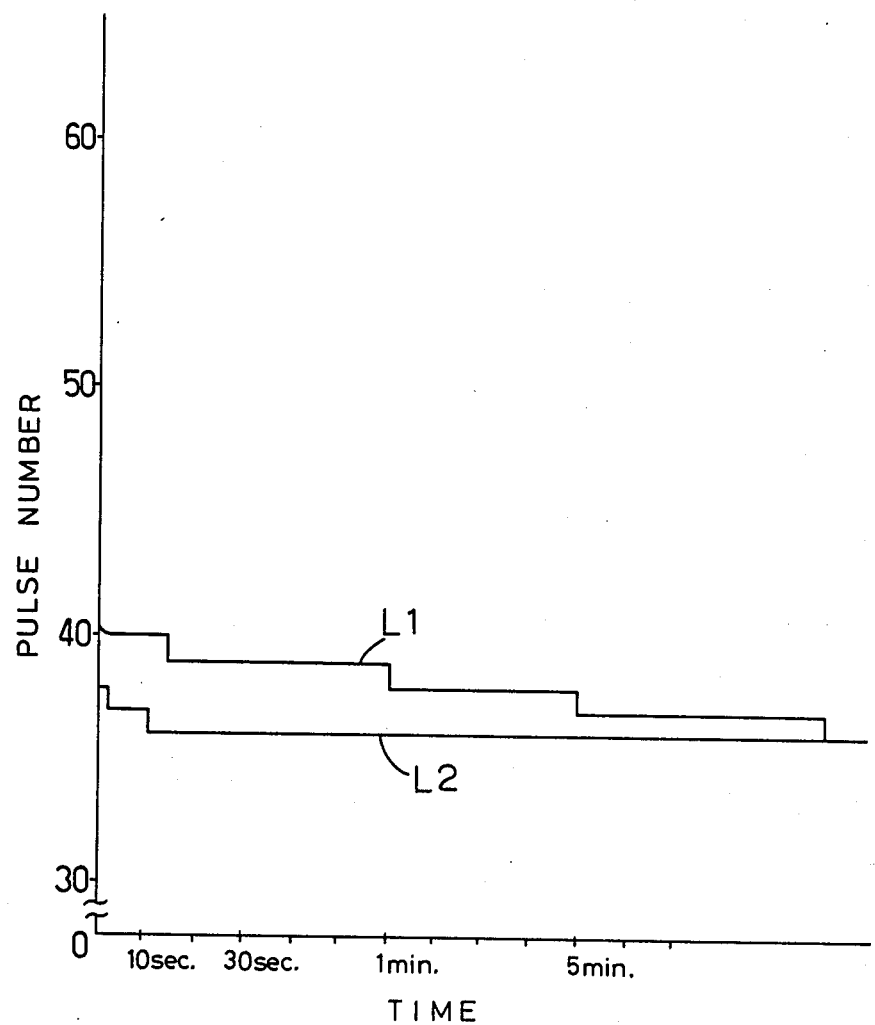
FIG. 23 is a diagram showing changes in the number of pulses in an unloaded condition, in respect of two cases when the drilling machine was operated after non-employment thereof for a long period of time and when the drilling machine was in a state of continuously operated.

In this connection, tests were conducted along this embodiment, the results of which are illustrated in FIGS. 22, 23 and Table 1. As shown in these figures and table, during one drilling process and with the drill 1 operated in an unloaded state, the variation in the number of the pulse signals SG16 corresponding to the rotational torque of the drill 1 excluding the cutting torque is very small, and this variation, i.e. pulse error, turned out to be smaller than one pulse regardless of variations in the starting current and in external power supply. Besides, when the spindle motor 26 is driven in a stable state and in the absence of a variation in external power supply, etc. and a load is applied to the drill 1, the load current of the spindle motor 26 varies according to changes in the number of pulse in such a manner as shown in Table 2.

From the above it is seen that in the case of the present embodiment the minimum value of the torque difference (A), namely, the minimum number of pulse, can be set to "2" and that the corresponding variation in the load currrent is 5 mA. However, when using this drilling machine at ordinary places there always occur variations in external power supply, etc. and the variation in the load current due to them is ±10 mA (20 mA from maximum to minimum). Even in such a case, as previously stated, the minimum value of the torque difference (A) remains unchanged in the present embodiment, but according to the conventional system wherein the cutting torque is detected on the basis of a motor current, when there is a current variation below 22 mA, it is impossible to discriminate whether this variation is due to the cutting torque or to a variation in external power supply. Therefore the minimum value of the current set value (ΔIs) is obliged to be 22 mA at the least.

In the drilling machine of this embodiment, therefore, even a small variation in the cutting torque of the drill 1 can be detected exactly whereby it becomes possible to perform the drilling operation by the use of a drill which is slenderer and easier to be broken as compared with the conventional motor current detecting system. That is, the torque difference (A) can be changed over a wide range according to the diameter of the drill 1.

FIG. 23 indicates comparison of the case indicated by a line L1 where the spindle motor 26 was operated directly from its stone-cold state unused for a long period of time, with the case indicated by a line L2 where the spindle motor 26 was operated from its warmed state after its continuous operation. FIG. 23 shows that there is little difference between both cases in respect of variation in the number of the pulse signals SG16. Therefore, even if this drilling machine is operated from a stone-cold state unused for a long period of time of the spindle motor 26, the cutting torque of the drill 1 can be detected exactly regardless of variations in the load current due to changes in the internal resistance of the motor itself.

Figure 24:
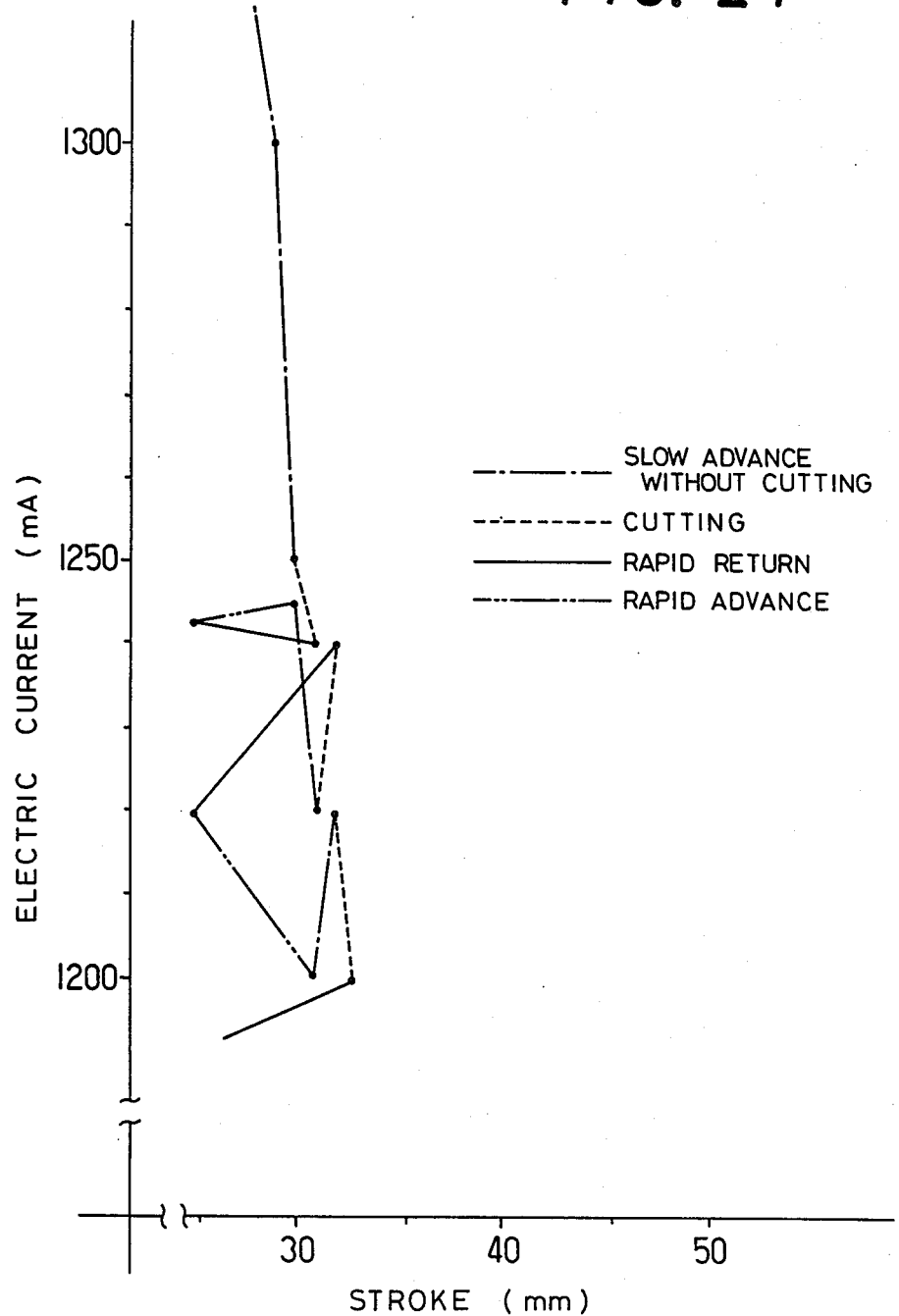
FIG. 24 is a diagram showing changes in the load current value of the spindle motor when the motor was started after non-employment for a long period of time for a cutting operation.

In an experiment which was conducted by using an apparatus of this embodiment, under a condition wherein the spindle motor 26 was started from the stone-cold status after a long time of non-employment, variation of the load current observed on the spindle motor 26 in the course of drilling of a workpiece was dispersed a great deal, as shown in FIG. 24, which eloquently proved that exact detection of the drilling torque is impossible in the conventional detection method by the motor current.

Figure 25:
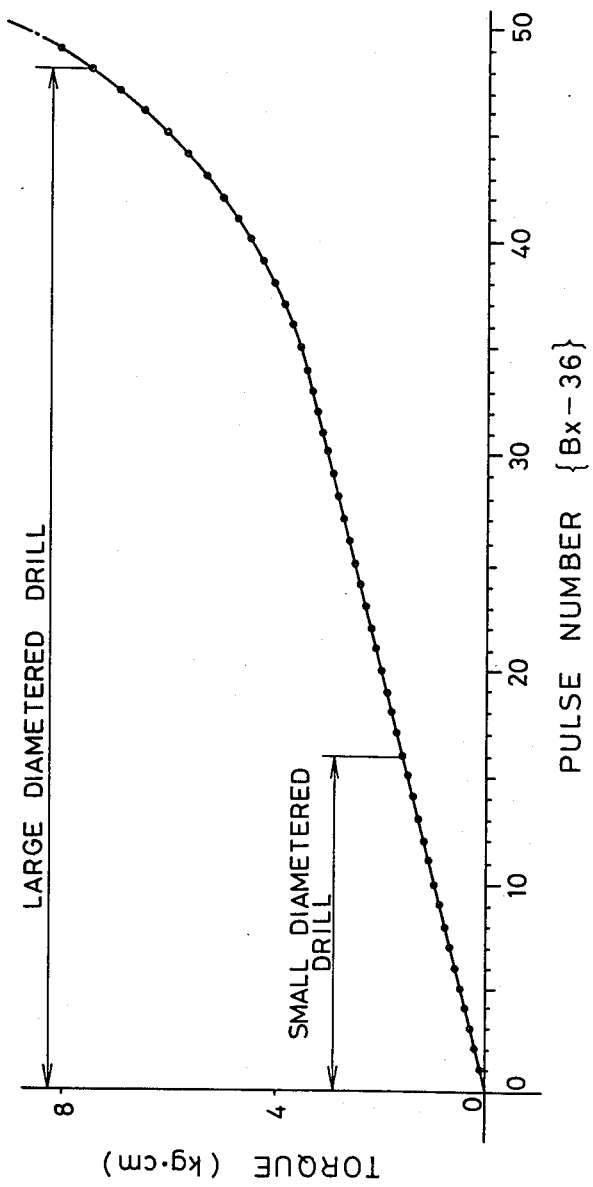
FIG. 25 is a diagram showing the relationship between the rotational torque of a drill and the number of pulses.

As some slits 21a formed in the wheel disk 21 are arranged with exponentially increasing intervals in this embodiment, it is allowed to vary the setting area of the allowable torque value (B1), as shown in FIG. 25, according to the condition of the used drill 1, either large or small in the diameter thereof. It is therefore possible in the case of a small diametered drill to detect a minute cutting torque and in the case of a large diametered drill to detect a rough cutting torque, which makes the method of setting torque values remarkably easy. Furthermore, the cutting torque value to be detected can be altered easily by changing the spring constant of the transmission spring 17.

Although the slits 21a are formed in the wheel disk 21 and the reference hole 22c is formed in the shutter disk 22 in this embodiment, both disks 21 and 22 may be formed of a transparent material and black marks may be attached, instead of the slits 21a and the hole 22c, to the corresponding places assumed for them as the targets to be detected.

Besides, it is permissible to substitute, in place of the combination of the slits 15 and the photocoupler 22, for either combination of a magnetic piece disposed on a nonmagnetic disk and a proximity switch or of a plurality of permanent magnets and a Hall element. In the case of the latter combination the shutter disk should be made of a magnetic material.

Furthermore, the foregoing transmission spring can also be replaced by a torsion bar or a rotation transmitting mechanism using a magnetic force.

In this embodiment, moreover, the abutment 11 is used as means for nullifying the action of the one-way clutch 57 by moving the slide 55 backward against the coiled spring 56, but the same object can be attained by means of a solenoid or the like operated with a detected signal from the most forward position detecting photocoupler 65 due to the movement of the quill 3 to its most forward position R.

What is claimed is:

1. A drilling machine comprising:
   a frame;
   a quill reciprocably mounted in said frame;
   quill feed means for reciprocating said quill in forward and backward directions;
   a spindle rotatably mounted in said quill and having a tool at one end thereof;
   a driven member operatively connected with said spindle;
   a driving member disposed on a common axis with said driven member;
   means for transmitting rotation from said driving member to said driven member, said transmitting means permitting said driven and driving members to produce a relative angular displacement with respect to each other in proportion to magnitude of a load applied to said driven member;
   angular displacement detecting means for detecting said relative angular displacement between said two members, comprising a multiplicity of detectable signal portions, the number of the signal portions to be detected varying in proportion to said relative angular displacement, said detecting means generating a series of pulse signals the number of which is equal to the number of the detected signal portions;
   means for counting the number of said pulse signals;
   memory means for memorizing the number of said pulse signals counted by said counting means, while said tool is in a predetermined position separated from the workpiece, for use as a reference number;
   means for comparing the actual number of said pulse signals which are counted by said counting means while said tool is cutting the workpiece, with said reference number, and generating an overload signal when a difference between said two numbers exceeds a predetermined value; and
   control means for controlling said quill feed means to make said quill repeat a reciprocating cycle including returning said quill to retract said tool to said predetermined position upon generation of said overload signal during a drilling cut by said tool on the workpiece, and advancing again said quill from said predetermined position for resuming the following drilling cut on said workpiece.

2. A drilling machine according to claim 1 further comprising position sensing means for generating a most forward position signal when said quill has been moved to a predetermined most forward position, said quill being returned in response to said most forward position signal to a predetermined most backward position by said controlling means.

3. A drilling machine according to claim 1, wherein said counting means comprises a counter which is reset for every one rotation of either one of said driving member and said driven member.

4. A drilling machine according to claim 1, wherein said angular displacement detecting means comprises:
- a wheel disk attached to one of said driving and driven members and having said multiplicity of detectable signal portions formed in spaced relation with each other along a circle concentric with said common axis,
- signal portion detecting means for detecting said signal portions of said wheel disk and generating said pulse signals corresponding to said signal portions when said wheel disk is rotated, and
- a shutter disk attached to the other of said driving member and said driven member in opposed relation with said wheel disk and having a shutter portion formed thereon for partially shutting consecutive ones of said signal portions to interrupt the detecting operation of said signal portion detecting means, said shutter portion being movable relative to a specific one of said signal portions according to said relative angular displacement to change the number of said signal portions which are exposed out of said shutter portion and detected by said signal portion detecting means, whereby said counting means counts the number of said pulse signals from said signal portion detecting means in each rotation of said wheel disk.

5. A drilling machine according to claim 4, wherein said wheel disk comprises a plurality of slits, and said signal portion detecting means comprises a photo sensor disposed on said frame for detecting said slits and generating one pulse every time when detecting each one of said slits.

6. A drilling machine according to claim 4, wherein said signal portions on said wheel disk are arranged so that the space between every two of said signal portions neighboring to each other is exponentially enlarged.

7. A drilling machine according to claim 1, wherein said transmitting means comprises a coiled spring disposed between said driving member and said driven member.

8. A drilling machine comprising:
- a frame;
- a quill reciprocably mounted in said frame;
- quill feed means for reciprocating said quill in forward and backward directions;
- a spindle rotatably mounted in said quill and having a tool at one end thereof;
- a driven member operatively connected with said spindle;
- a driving member disposed on a common axis with said driven member;
- means for transmitting rotation from said driving member to said driven member, said transmitting means permitting said driven and driving members to produce a relative angular displacement with respect to each other in proportion to magnitude of a load applied to said driven member;
- angular displacement detecting means for detecting said relative angular displacement between said two members and generating a series of pulse signals the number of which is correlative with an amount of said relative angular displacement;
- means for counting the number of said pulse signals;
- memory means for memorizing the number of said pulse signals counted by said counting means, while said tool is in a predetermined position separated from the workpiece, for use as a reference number;
- means for comparing the actual number of said pulse signals which are counted by said counting means while said tool is cutting the workpiece, with said reference number, and generating an overload signal when a difference between said two numbers exceeds a predetermined value;
- control means for controlling said quill feed means to make said quill repeat a reciprocating cycle including returning said quill to retract said tool to said predetermined position upon generation of said overload signal during a drilling cut by said tool on the workpiece, and advancing again said quill from said predetermined position for resuming the following drilling cut on said workpiece; and
- sensing means for detecting said predetermined position and generating a signal each time said quill is returned to retract said tool to said predetermined position, said control means controlling said memory means to renew the memorized number of said pulse signals every time when said sensing means generates said signal.

9. A drilling machine comprising:
- a frame;
- a quill reciprocably mounted in said frame;
- quill feed means for reciprocating said quill in forward and backward directions;
- a spindle rotatably mounted in said quill and having a tool at one end thereof;
- a driven member operatively connected with said spindle;
- a driving member disposed on a common axis with said driven member;
- means for transmitting rotation from said driving member to said driven member, said transmitting means permitting said driven and driving members to produce a relative angular displacement with respect to each other in proportion to magnitude of a load applied to said driven member;
- angular displacement detecting means for detecting said relative angular displacement between said two members and generating a series of pulse signals the number of which is correlative with an amount of said relative angular displacement;
- means for counting the number of said pulse signals;
- memory means for memorizing the number of said pulse signals counted by said counting means, while said tool is in a predetermined position separated from the workpiece, for use as a reference number;
- means for comparing the actual number of said pulse signals which are counted by said counting means while said tool is cutting the workpiece, with said reference number, and generating an overload signal when a difference between said two numbers exceeds a predetermined value;
- control means for controlling said quill feed means to make said quill repeat a reciprocating cycle including returning said quill to retract said tool to said predetermined position upon generation of said overload signal during a drilling cut by said tool on the workpiece, and advancing again said quill from said predetermined position for resuming the following drilling cut on said workpiece;

means for presetting a predetermined number of reciprocation of said quill in one drilling process; and repeat counting means for counting said overload signal from said comparing means in said one drilling process and for generating a signal when the number counted by said repeat counting means is equal to said predetermined number of reciprocation, said control means controlling said quill feed means to stop said drilling process in response to said signal from said repeat counting means.

10. A drilling machine according to claim 9 further comprising means for warning an opeaator when said repeat counting means generates said signal.

11. A drilling machine comprising:

a frame;

a quill reciprocably mounted in said frame;

quill feed means for reciprocating said quill in forward and backward directions;

a spindle rotatably mounted in said quill and having a tool at one end thereof;

a driven member operatively connected with said spindle;

a driving member disposed on a common axis with said driven member;

means for transmitting rotation from said driving member to said driven member, said transmitting means permitting said driven and driving members to produce a relative angular displacement with respect to each other in proportion to magnitude of a load applied to said driven member;

angular displacement detecting means for detecting said relative angular displacement between said two members and generating a series of pulse signals the number of which is correlative with an amount of said relative angular displacement;

means for counting the number of said pulse signals;

memory means for memorizing the number of said pulse signals counted by said counting means, while said tool is in a predetermined position separated from the workpiece, for use as a reference number;

means for comparing the actual number of said pulse signals which are counted by said counting means while said tool is cutting the workpiece, with said reference number, and generating an overload signal when a difference between said two numbers exceeds a predetermined value;

control means for controlling said quill feed means to make said quill repeat a reciprocating cycle including returning said quill to retract said tool to said predetermined position upon generation of said overload signal during a drilling cut by said tool on the workpiece, and advancing again said quill from said predetermined position for resuming the following drilling cut on said workpiece; and sensing means for generating a signal each time said tool is positioned at a predetermined point separated from said workpiece and said predetermined position, said control means controlling said memory means to renew the memorized number of said pulse signals at every time when said sensing means generates said signal.

* * * * *